(12) United States Patent
Kirchhoff et al.

(10) Patent No.: US 9,248,898 B1
(45) Date of Patent: Feb. 2, 2016

(54) SYSTEMS AND METHODS FOR CONTROLLING SPEED OF A MARINE VESSEL

(71) Applicant: Brunswick Corporation, Lake Forest, IL (US)

(72) Inventors: Thomas S. Kirchhoff, Fond du Lac, WI (US); Jason S. Arbuckle, Horicon, WI (US); Matthew W. Snyder, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 14/258,516

(22) Filed: Apr. 22, 2014

Related U.S. Application Data

(63) Continuation-in-part of application No. 13/787,108, filed on Mar. 6, 2013, now Pat. No. 9,039,468.

(51) Int. Cl.
*B63H 21/22* (2006.01)
*B63H 21/21* (2006.01)

(52) U.S. Cl.
CPC .................................. *B63H 21/213* (2013.01)

(58) Field of Classification Search
USPC .............................................................. 440/1
IPC .............. B63H 21/213,2021/216; F02B 61/045
See application file for complete search history.

(56) References Cited

U.S. PATENT DOCUMENTS

| | | |
|---|---|---|
| 2,585,502 A | 2/1952 | Schneider |
| 2,775,328 A | 12/1956 | Yokel |
| 4,519,335 A | 5/1985 | Krautkremer et al. |
| 5,172,324 A | 12/1992 | Knight |
| 5,202,835 A | 4/1993 | Knight |
| 5,331,558 A | 7/1994 | Hossfield et al. |
| 5,386,368 A | 1/1995 | Knight |
| 5,491,636 A | 2/1996 | Robertson et al. |
| 5,884,213 A | 3/1999 | Carlson |
| 6,059,226 A | 5/2000 | Cotton et al. |
| 6,092,007 A | 7/2000 | Cotton et al. |
| 6,234,853 B1 | 5/2001 | Lanyi et al. |
| 6,273,771 B1 | 8/2001 | Buckley et al. |
| 6,377,889 B1 | 4/2002 | Soest |
| 6,446,003 B1 | 9/2002 | Green et al. |

(Continued)

OTHER PUBLICATIONS

Unpublished U.S. Appl. No. 12/971,892, filed Dec. 17, 2010.

(Continued)

*Primary Examiner* — Stephen Avila
(74) *Attorney, Agent, or Firm* — Andrus Intellectual Property Law, LLP

(57) ABSTRACT

A system that controls the speed of a marine vessel includes first and second propulsion devices that produce first and second thrusts to propel the marine vessel. A control circuit controls orientation of the first and second propulsion devices about respective steering axes to control directions of the first and second thrusts. A first user input device is moveable between a neutral position and a non-neutral detent position. When a second user input device is actuated while the first user input device is in the detent position, the control circuit does one or more of the following so as to control the speed of the marine vessel: varies a speed of a first engine of the first propulsion device and a speed of a second engine of the second propulsion device; and varies one or more alternative operating conditions of the first and second propulsion devices.

19 Claims, 13 Drawing Sheets

(56) References Cited

U.S. PATENT DOCUMENTS

| | | | |
|---|---|---|---|
| 6,678,589 | B2 | 1/2004 | Robertson et al. |
| 6,994,046 | B2 | 2/2006 | Kaji et al. |
| 6,995,527 | B2 | 2/2006 | DePasqua |
| 7,131,385 | B1 | 11/2006 | Ehlers et al. |
| 7,220,153 | B2 * | 5/2007 | Okuyama .................. 440/1 |
| 7,261,605 | B2 | 8/2007 | Misao et al. |
| 7,267,068 | B2 | 9/2007 | Bradley et al. |
| 7,305,928 | B2 | 12/2007 | Bradley et al. |
| 7,366,593 | B2 | 4/2008 | Fujimoto et al. |
| 7,416,458 | B2 | 8/2008 | Suemori et al. |
| 7,429,202 | B2 | 9/2008 | Yazaki et al. |
| 7,455,557 | B2 | 11/2008 | Mizutani |
| 7,467,595 | B1 | 12/2008 | Lanyi et al. |
| 7,476,134 | B1 | 1/2009 | Fell et al. |
| 7,883,383 | B2 | 2/2011 | Larsson |
| 8,145,371 | B2 | 3/2012 | Rae et al. |
| 8,155,811 | B2 | 4/2012 | Noffsinger et al. |
| 8,439,800 | B1 | 5/2013 | Bazan et al. |
| 8,478,464 | B2 | 7/2013 | Arbuckle et al. |
| 2005/0170713 | A1 | 8/2005 | Okuyama |
| 2007/0032923 | A1 | 2/2007 | Mossman et al. |
| 2007/0089660 | A1 | 4/2007 | Bradley et al. |
| 2010/0138083 | A1 | 6/2010 | Kaji |
| 2010/0145558 | A1 | 6/2010 | Kaji |
| 2011/0166724 | A1 | 7/2011 | Hiramatsu |
| 2012/0248259 | A1 | 10/2012 | Page et al. |

OTHER PUBLICATIONS

Unpublished U.S. Appl. No. 11/965,583, filed Dec. 27, 2007.
Unpublished U.S. Appl. No. 13/787,108, filed Mar. 6, 2013.
Mercury Marine, Axius Generation 2 Installation Manual, Jul. 2010, pp. 6-9.
Mercury Marine, Joystick Piloting for Outboards Operation Manual, 2013, pp. 16-17.
Mercury Marine, Mercury SmartCraft Operation Manual, 2001, pp. 3-8 to 3-9.
Mercury Marine, Zeus 3000 Series Pod Drive Models Operation Manual, 2013, pp. 41-45.

* cited by examiner

SYSTEMS AND METHODS FOR CONTROLLING SPEED OF A MARINE VESSEL

CROSS REFERENCE TO RELATED APPLICATION

This application is a continuation-in-part of U.S. patent application Ser. No. 13/787,108, filed Mar. 6, 2013, now U.S. Pat. No. 9,039,468, issued May 26, 2015, which is hereby incorporated by reference in its entirety.

FIELD

The present disclosure relates to systems and methods for controlling speed of a marine vessel.

BACKGROUND

U.S. Pat. No. 6,273,771, which is hereby incorporated by reference in entirety, discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,267,068, which is hereby incorporated by reference in entirety, discloses a marine vessel that is maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 7,305,928, which is hereby incorporated by reference in entirety, discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

Unpublished U.S. patent application Ser. No. 11/965,583, which is hereby incorporated by reference in entirety, discloses a system and method for controlling movement of a marine vessel. An operator input device outputs a signal that is representative of an operator-desired heading of the vessel. A first sensor outputs a signal that is representative of a sensed actual heading of the vessel. A low gain proportional integral controller outputs a yaw rate request based upon the difference between the operator-desired heading and the sensed actual heading. A second sensor has an output that is representative of a sensed actual yaw rate of the vessel. A high gain proportional integral controller outputs a yaw moment request based upon the difference between the yaw rate request and the sensed actual yaw rate. The heading of the vessel is controlled based upon the yaw moment request.

Unpublished U.S. patent application Ser. No. 13/787,108 discloses a system that controls speed of a marine vessel including first and second propulsion devices that produce first and second thrusts to propel the marine vessel. A control circuit controls orientation of the propulsion devices between an aligned position in which the thrusts are parallel and an unaligned position in which the thrusts are non-parallel. A first user input device is moveable between a neutral position and a non-neutral detent position. When the first user input device is in the detent position and the propulsion devices are in the aligned position, the thrusts propel the marine vessel in a desired direction at a first speed. When a second user input device is actuated while the first user input device is in the detent position, the propulsion devices move into the unaligned position and propel the marine vessel in the desired direction at a second, decreased speed without altering the thrusts.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a system that controls a speed of a marine vessel comprises a first propulsion device that produces a first thrust to propel the marine vessel and a second propulsion device that produces a second thrust to propel the marine vessel. A control circuit controls orientation of the first and second propulsion devices about first and second steering axes, respectively, so as to control a direction of the first thrust and a direction of the second thrust. A first user input device is moveable between a neutral position and a non-neutral detent position. The system also includes a second user input device. When the second user input device is actuated while the first user input device is in the detent position, the control circuit does one or more of the following so as to control the speed of the marine vessel: varies a speed of a first engine of the first propulsion device and a speed of a second engine of the second propulsion device; and varies one or more alternative operating conditions of the first and second propulsion devices.

According to another example of the present disclosure, a method for controlling a speed of a marine vessel having a first propulsion device that produces a first thrust to propel the marine vessel and a second propulsion device that produces a second thrust to propel the marine vessel comprises receiving a trolling mode command with a control circuit and thereafter varying a trolling speed of the marine vessel with the control circuit by doing one or more of the following: varying a speed of a first engine of the first propulsion device and a second engine of the second propulsion device; and varying one or more alternative operating conditions of the first and second propulsion devices.

According to a further example of the present disclosure, a method for controlling a speed of a marine vessel having first and second propulsion devices with first and second engines operatively connected to first and second transmissions, the first and second propulsion devices controlled by a control circuit communicatively connected to a throttle/shift lever and a joystick, comprises determining if the throttle/shift lever has been placed in a forward detent position. If so, the method further comprises determining if the joystick has been actuated in a forward direction. If so, the method further comprises doing one of the following: decreasing a splay angle between a direction of thrust of the first propulsion device and a direction of thrust of the second propulsion device; decreasing a slip of the first and second transmissions; and increasing a speed of the first and second engines. The method may further comprise determining if the joystick has been actuated in a rearward direction, and, if so doing one of the following: decreasing the speed of the first and second engines; increasing the slip of the first and second transmissions; and increasing the splay angle. According to the method, the control circuit prioritizes one of decreasing the splay angle and decreasing the slip over increasing the engine speed in response to repeated actuation of the joystick in the forward direction, and prioritizes decreasing the engine speed over one of increasing the slip and increasing the splay angle in response to repeated actuation of the joystick in the second direction.

BRIEF DESCRIPTION OF DRAWINGS

Examples of systems and methods for controlling speed in a marine vessel are described with reference to the following Figures. The same numbers are used throughout the Figures to reference like features and like components.

FIG. 6 is a bottom view of a hull of the marine vessel showing first and second propulsion devices extending there through;

DETAILED DESCRIPTION OF DRAWINGS

In the present description, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible within the scope of the appended claims. Each limitation in the appended claims is intended to invoke interpretation under 35 USC §112(f), only if the terms "means for" or "step for" are explicitly recited in the respective limitation.

Figure 2:
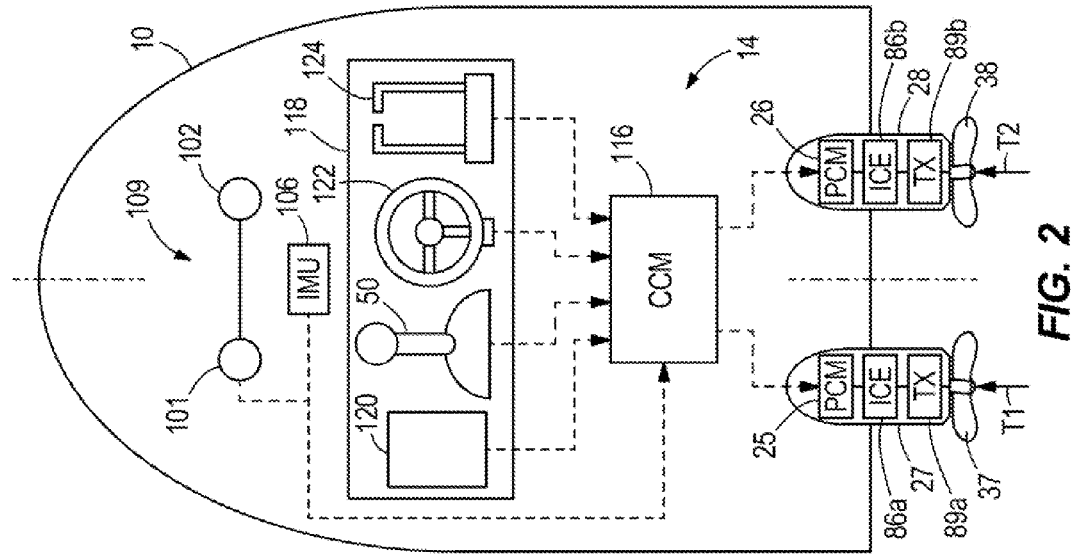
FIG. 2 is a schematic representation of a control circuit on the marine vessel.
Figure 1:
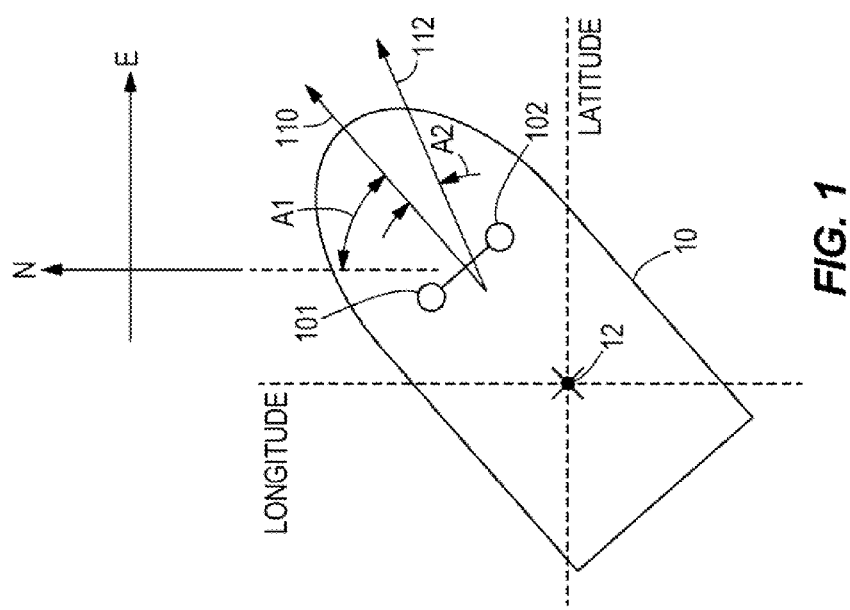
FIG. 1 shows a marine vessel at a desired heading.

FIGS. 1 and 2 show a marine vessel 10. The marine vessel 10 is capable of operating, for example, in a normal operating mode, a waypoint tracking mode, or an auto heading mode, as described herein below. It should be understood that in any mode, the marine vessel 10 may also operate at reduced speeds, in what is conventionally known as a trolling mode. This trolling mode can be selected and accomplished in a number of different ways, as described herein below. Generally, trolling speeds are considered to be boat speeds under 10 mph although such exact speed is not limiting on the scope of the present disclosure. The present disclosure provides systems and methods for varying the trolling speed of a marine vessel with increased control and in different manners than previously available.

With reference to FIG. 1, as mentioned above, one mode in which the marine vessel 10 of the present disclosure is capable of functioning is an auto heading mode, in which the marine vessel 10 travels in a desired direction chosen by an operator of the marine vessel 10. For example, FIG. 1 shows the marine vessel 10 at an exemplary present global position, measured as longitude and latitude, and an exemplary heading represented by an angle A1 between a heading arrow 110 of the marine vessel 10 and a due north vector N. While engaged in auto heading, the vessel 10 will leave its present global position and will travel in the direction of heading arrow 110 until an operator of the marine vessel 10 commands the marine vessel 10 to change course. Also shown in FIG. 1 is an exemplary present (or actual) heading of the marine vessel 10, represented by arrow 112. In another example, the arrow 112 represents a course over ground of the marine vessel 10, which course may or may not be in the same direction as the direction in which the bow of the marine vessel is pointed (i.e., its actual heading). While the marine vessel 10 is underway, the actual heading and/or course may be different than the desired heading due to a number of factors, including wind, waves, etc. that force the marine vessel 10 off course. As will be more fully described herein below, a control circuit can operate according to an auto heading algorithm to adjust the heading of the marine vessel 10 to minimize a difference, represented by an angle A2, between the actual heading and/or course in the direction of arrow 112 and the desired heading in the direction of arrow 110.

Figure 6:
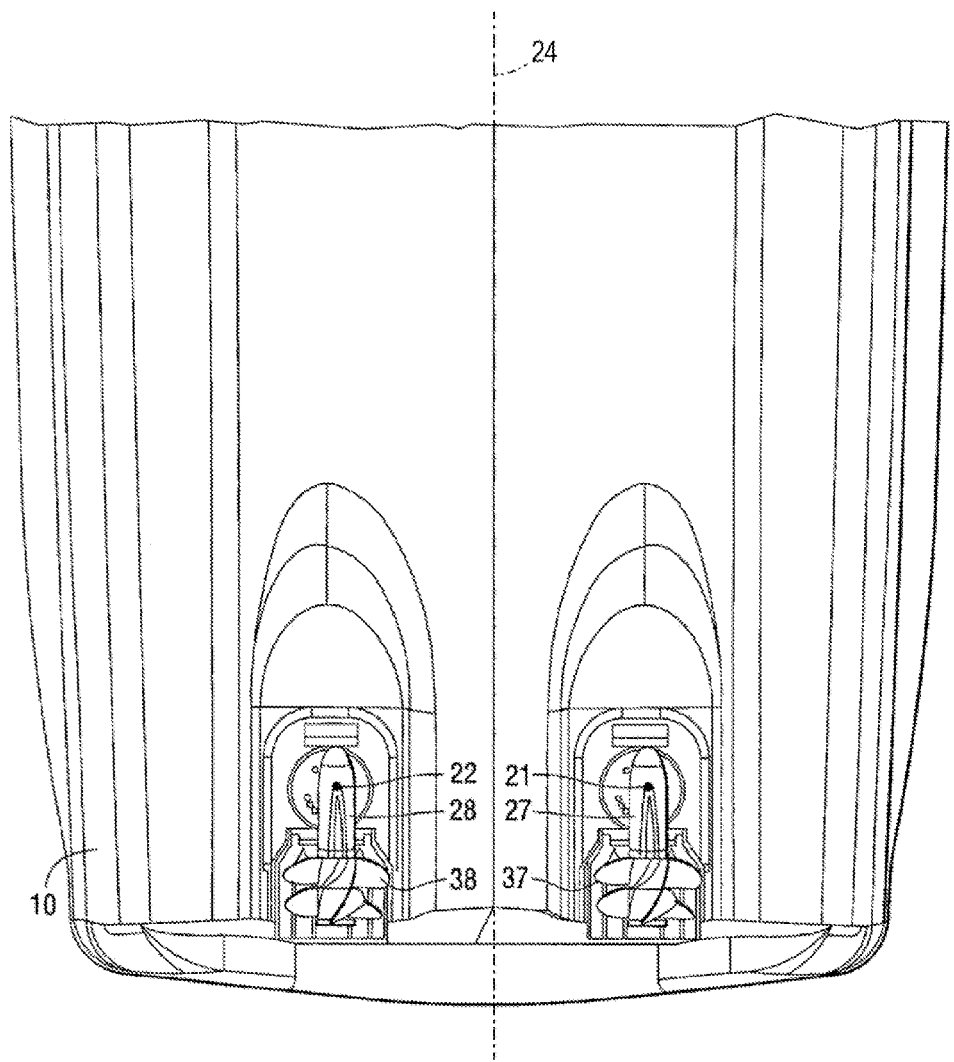
Figure 7:
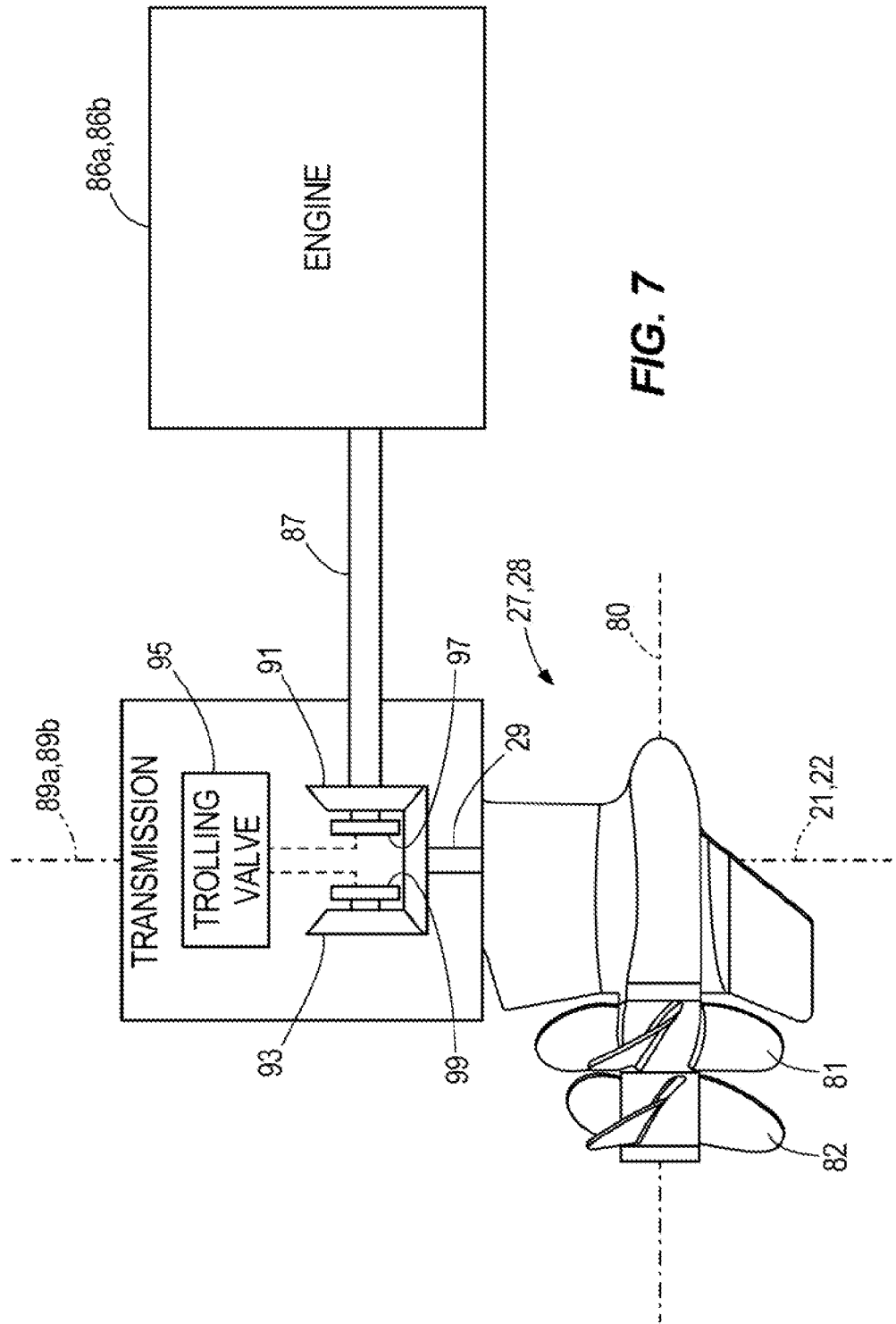
FIG. 7 is a side view showing an arrangement of an engine, transmission, and propulsion device used in conjunction with the present disclosure.

FIG. 2 illustrates a marine vessel 10 having first and second propulsion devices 27, 28 that produce first and second thrusts T1, T2 to propel the marine vessel 10, as will be more fully described herein below. As illustrated in FIG. 2, the first and second propulsion devices 27, 28 are outboard motors, but they could alternatively be inboard motors, stern drives or pod drives, as shown in FIGS. 6 and 7 and more fully described herein below. Each propulsion device is provided with an engine 86a, 86b operatively connected to a transmission 89a, 89b, in turn operatively connected to a propeller 37, 38.

The marine vessel 10 also includes various control elements that make up a control circuit 14. The control circuit 14 for example comprises an operation console 118 in signal communication, for example via a CAN bus as described in U.S. Pat. No. 6,273,771, with one or more controllers, such as for example a command control module (CCM) 116 and propulsion control modules (PCM) 25, 26 associated with the respective propulsion devices 27, 28. Each of the CCM 116 and the PCMs 25, 26 may include a memory and a programmable processor. As is conventional, the processor can be communicatively connected to a computer readable medium that includes volatile or nonvolatile memory upon which computer readable code is stored. The processor can access the computer readable code and the computer readable medium upon executing the code carries out functions as described herein below. In other examples of the control circuit 14, only one controller is provided for the system rather than having both a CCM and PCMs. In other examples, one CCM is provided for each propulsion device, and/or additional control modules are provided for controlling engine speed and functions separately from steering and trim of the propulsion devices. For example, the PCMs 25, 26 may control the engines 86a, 86b and transmissions 89a, 89b of the propulsion devices 27, 28, while additional thrust vector modules (TVMs) may control their orientation. In other examples of the control circuit 14, the vessel control elements are connected via wireless communication rather than by a serially wired CAN bus. It should be noted that the dashed lines shown in FIG. 2 are meant to show only that the various control elements are capable of communicating with one another, and do not represent actual wiring connecting the control elements, nor do they represent the only paths of communication between the elements.

The operation console 118 includes a number of user input devices, such as an interactive video display 120, a joystick 50, a steering wheel 122, and a throttle/shift lever 124. Each of these devices inputs commands to the command control module (CCM) 116. The CCM 116 in turn communicates with the first and second propulsion devices 27, 28, for example, by communicating with the PCMs 25, 26 via a CAN bus. The CCM 116 also receives information from an inertial measurement unit (IMU) 106. The IMU 106 comprises a portion of a global positioning system (GPS) 109 which, in the example shown, comprises a first GPS device 101 and a second GPS device 102 which are each located at a preselected fixed position on the marine vessel 10 and provide information related to the global position of the marine vessel 10 in terms of latitude and longitude. Signals from the GPS devices 101, 102 and the IMU 106 are provided to the CCM 116. In one example, the IMU 106 can be a solid state, rate gyro electronic compass that detects the direction of the earth's magnetic field using solid state magnetometers and indicates the marine vessel heading relative to magnetic north. The IMU 106 can be, for example, part 8M0048162 available from Mercury Marine, of Fond du Lac, Wis. In certain examples of the IMU 106, it comprises a differential correction receiver, accelerometers, angular rate sensors, and a microprocessor which manipulates the information obtained from these devices to provide information relating to the actual heading and/or course of the marine vessel 10, represented by arrow 112 in FIG. 1, and the velocity and acceleration of the marine vessel 10 in six degrees of freedom.

The interactive video display 120 allows an operator of the marine vessel to manually select various modes of operation associated with the marine vessel 10. One of those selections made by the operator of the marine vessel can provide an enabling signal which informs the CCM 116 that the operator desires to operate the vessel 10 in the auto heading mode in order to maintain a desired heading of the vessel 10. In other words, the operator can use the interactive video display 120 to activate the auto heading mode so that the marine vessel 10 is maintained at a desired heading (e.g., in the direction of heading arrow 110 in FIG. 1) with respect to a selected compass point.

The operation console 118 also includes the steering wheel 122 and the throttle/shift lever 124. These devices function in the conventional manner, such that rotation of the steering wheel 122 for example activates a transducer that provides a signal to the CCM 116 regarding a desired direction of the marine vessel 10. The CCM 116 in turn sends signals to the PCMs 25, 26 (and/or TVMs or additional modules if provided), which in turn activate steering actuators to achieve a desired orientation of the propulsion devices 27, 28. The throttle/shift lever 124 sends signals to the CCM 116 regarding the desired gear (forward, reverse, or neutral) and the desired rotational speed of engines associated with the propulsion devices 27, 28. The CCM 116 in turn sends signals to the PCMs 25, 26, which in turn activate electromechanical actuators in the engines for both shift and throttle. A manually operable control device, such as the joystick 50, can also be used to provide a signal to the CCM 116. The joystick 50 can be used to allow the operator of the marine vessel 10 to manually maneuver the marine vessel 10. It should be understood that in alterative examples, the various components 120, 50, 122, 124 may communicate directly with the PCMs 25, 26 or may communicate with one central controller.

Figure 4:
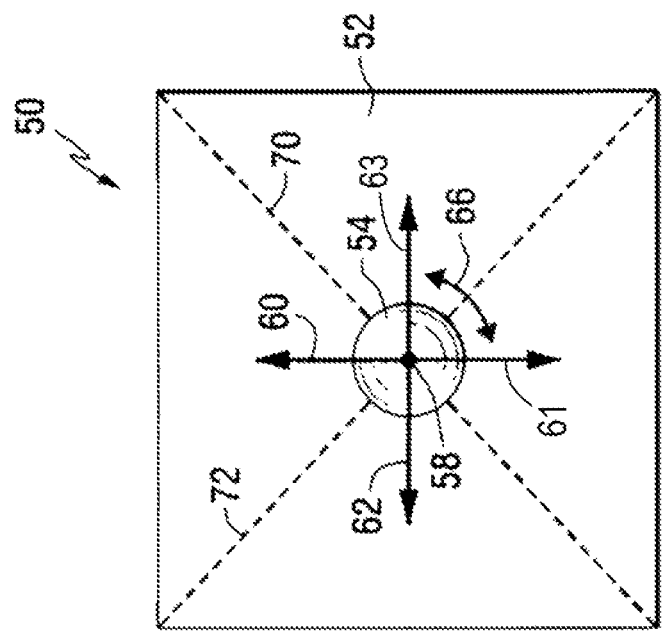
FIGS. 3 and 4 are representations of a joystick used in conjunction with the present disclosure.
Figure 3:
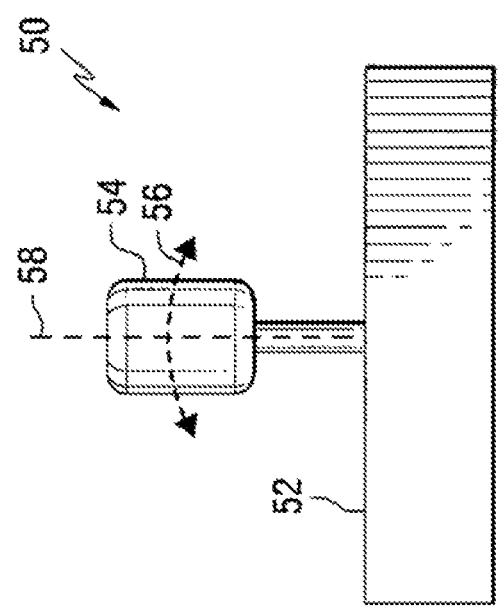

Referring for a moment to FIGS. 3 and 4, operation of the joystick 50 will now be described. FIG. 3 is a simplified schematic representation of the joystick 50 which provides a manually operable control device which can be used to provide a signal that is representative of a desired movement, selected by an operator, relating to the marine vessel 10. The example in FIG. 3 shows a base portion 52 and a handle 54 which can be manipulated by hand. In a typical application, the handle 54 is movable in the direction generally represented by arrow 56 and is also rotatable about an axis 58. It should be understood that the joystick handle 54 is movable by tilting it about its connection point in the base portion 52 in virtually any direction. Although arrow 56 is illustrated in the plane of the drawing in FIG. 3, a similar type of movement is possible in other directions that are not parallel to the plane of the drawing.

FIG. 4 is a top view of the joystick 50. The handle 54 can move, as indicated by arrow 56 in FIG. 3, in various directions which include those represented by arrows 60, 61, 62 and 63. However, it should be understood that the handle 54 can move in any direction relative to axis 58 and is not limited to the two lines of movement represented by arrows 60, 61, 62 and 63. In fact, the movement of the handle 54 has a virtually infinite number of possible paths as it is tilted about its connection point within the base portion 52. The handle 54 is also rotatable about axis 58, as represented by arrow 66. There are many different types of joystick devices that can be used to provide a signal that is representative of a desired movement of the marine vessel 10, as expressed by the operator of the marine vessel through movement of the handle 54.

With continued reference to FIG. 4, it can be seen that the operator can demand a purely linear movement either toward port, as represented by arrow 62, or starboard, as represented by arrow 63, a purely linear movement in a forward direction, as represented by arrow 60, or reverse direction as represented by arrow 61, or any combination of two of these directions. In other words, by moving the handle 54 along dashed line 70, a linear movement toward the right side and forward or toward the left side and rearward can be commanded. Similarly, a linear movement along line 72 could be commanded. Also, it should be understood that the operator of the marine vessel can request a combination of sideways or forward/reverse linear movement in combination with a rotation as represented by arrow 66. Any of these possibilities can be accomplished through use of the joystick 50 to the CCM 116 and eventually to the PCMs 25, 26. The magnitude, or intensity, of movement represented by the position of the handle 54 is also provided as an output from the joystick 50. In other words, if the handle 54 is moved slightly toward one side or the other, the commanded thrust in that direction is less than if, alternatively, the handle 54 was moved by a greater magnitude away from its vertical position with respect to the base portion 52. Furthermore, rotation of the handle 54 about axis 58, as represented by arrow 66, provides a signal representing the intensity of desired movement. A slight rotation of the handle about axis 58 would represent a command for a slight rotational thrust about a center of gravity 12 of the marine vessel 10 (FIG. 1). On the other hand, a more intense rotation of the handle 54 about its axis would represent a command for a higher magnitude of rotational thrust.

Figure 5:
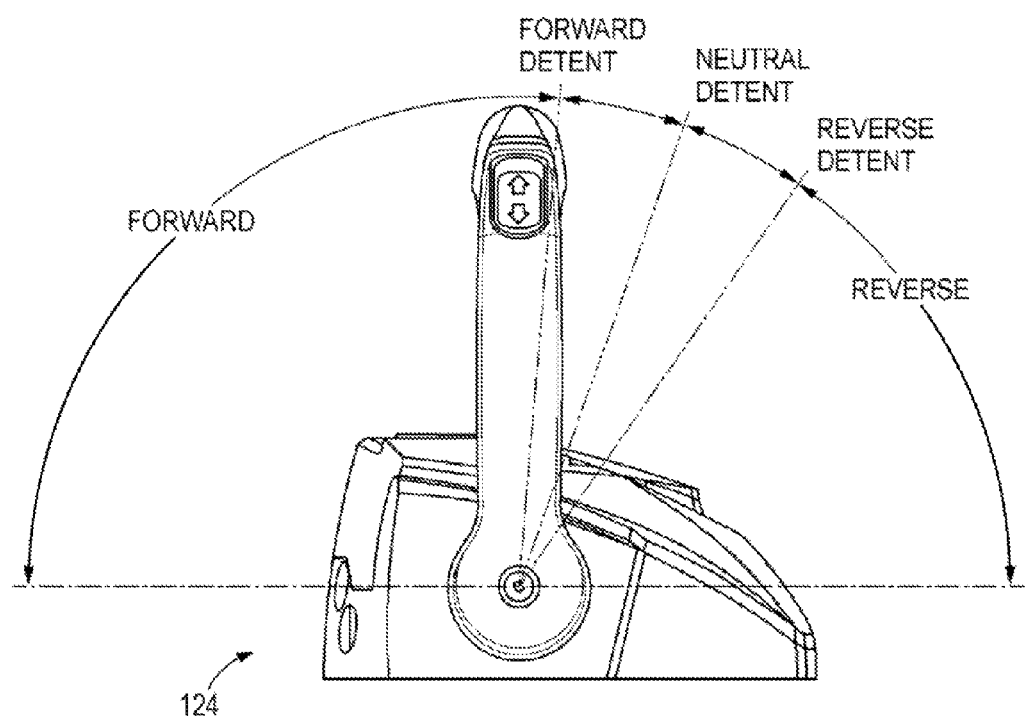
FIG. 5 is a representation of a throttle/shift lever.

Now with reference to FIG. 5, the throttle/shift lever 124 will be more fully described. The throttle/shift lever 124 is provided with a forward detent position, neutral detent position, and reverse detent position. The detent positions allow the operator of the vessel to physically detect when the throttle/shift lever 124 has moved into a new shift position by providing resistance when the throttle/shift lever has moved into a given detent position. The throttle/shift lever 124 is also provided with, for example, a transducer that provides a signal to the CCM 116, which in turn sends shift and throttle commands to the PCMs 25, 26 controlling the propulsion devices 27, 28. For example, while in neutral detent, the throttle/shift lever 124 sends a signal to the CCM 116 that the engine 86a, 86b (FIG. 7) should not be connected in torque transmitting relation with the propulsion device 27 or 28. In other words, in the neutral detent position, a clutch (not shown) between the engine output shaft and the propeller shaft is disengaged. When moved into forward detent, the throttle/shift lever 124 sends a signal to the CCM 116 to engage the clutch and connect the engine 86a, 86b in forward torque transmitting relation with the propulsion device 27 or 28 so as to rotate a propeller 37 or 38 (FIG. 6) of the propulsion device 27 or 28 at a speed related to a rotational speed of the engine 86a, 86b. As the throttle/shift lever 124 is moved further in the forward direction, more thrust is provided to the marine vessel 10 by the propulsion devices 27, 28. Similarly, when moved into reverse detent, the throttle/shift lever 124 sends a signal to the CCM 116, which sends a signal via the CAN bus to the PCM 25 or 26 to engage the clutch and connect the engine 86a, 86b in reverse torque transmitting relation with the propulsion device 27 or 28 so as to rotate the propeller 37 or 38 at a speed related to a rotational speed of the engine 86a, 86b.

With reference to FIGS. 6 and 7, an example in which the first and second propulsion devices 27, 28 are pod drives will be described, although the present disclosure is equally applicable to outboards and sterndrives. FIG. 6 is a view of the bottom portion of a hull of a marine vessel 10, showing first and second propulsion devices, 27 and 28, and propellers, 37 and 38, respectively. The first and second propulsion devices, 27 and 28, are rotatable about generally vertical steering axes, 21 and 22. In one example, in order to avoid interference with portions of the hull of the marine vessel 10, the two propulsion devices can be provided with limited rotational steering capabilities. For example, neither the first nor the second propulsion device 27, 28 is provided with the capability of rotating 360 degrees about its respective steering axis, 21 or 22.

FIG. 7 is a side view showing the arrangement of a propulsion device, such as 27 or 28, associated with a mechanism that is able to rotate the propulsion device about its steering axis, 21 or 22. The driveshaft 29 of the propulsion device extends vertically and parallel to the steering axis 21, 22 and is connected in torque transmitting relation with a generally horizontal propeller shaft that is rotatable about a propeller axis 80. The example of the present disclosure shown in FIG. 7 comprises two propellers, 81 and 82, that are attached to the propeller shaft, but the propulsion device could alternatively comprise one propeller. The motive force to drive the propellers, 81 and 82, is provided by an internal combustion engine 86a or 86b that is located within the bilge of the marine vessel 10. The engine 86a or 86b is configured with its crankshaft aligned for rotation about a horizontal axis and has an output shaft 87 connected in torque transmitting relation with a transmission 89a or 89b. The transmission 89a or 89b is shiftable between a forward gear 91 and a reverse gear 93. An optional trolling valve 95 is operatively connected to a forward clutch 97 and a reverse clutch 99. The clutches 97, 99 engage the gears 91, 93, respectively, for example via pressure plates or gear teeth. For an example in which pressure plates are used, see U.S. Pat. No. 8,439,800, which is hereby incorporated by reference in its entirety. For an example in which gears are used, see U.S. Pat. No. 7,261,605.

The amount of engagement of the clutches 97, 99 with the gears 91, 93 can optionally be controlled by the trolling valves 95, where engagement can range from not engaged (100% slip) to fully engaged (0% slip). In one example, first and second trolling, valves 95 control the slip of the first and second transmissions 89a, 89b, respectively. Control over slip results in control over the resulting speed of the propellers 81, 82 on the first and second propulsion devices 27, 28, as more or less rotational power from the output shaft 87 of the engine 86a or 86b is transmitted to the gears 91 or 93, which in turn provide more or less torque to the propeller shaft. Therefore, a higher percentage of slip leads to lower propeller speeds (and thus lower boat speeds), and a lower percentage of slip leads to greater propeller speeds (and thus greater boat speeds). Transmissions equipped with trolling valves 95 are known to those having skill in the art and will therefore not be described more fully herein.

In one example of the present disclosure, the engine 86a or 86b is a diesel engine, but the engine 86a or 86b could alternatively be a gasoline engine. In the example shown, each of the two propulsion devices 27, 28 is driven by a separate engine 86a or 86b and connected thereto by a separate transmission 89a or 89b, see FIG. 2, each transmission 89a, 89b optionally provided with a trolling valve 95, see FIG. 7. In addition, each of the propulsion devices 27, 28 is independently steerable about its respective steering axis, 21 or 22. The steering axes, 21 and 22, are generally vertical and parallel to each other.

With continued reference to FIG. 7, the submerged portion of the propulsion device, 27 or 28, contains rotatable shafts, gears, and bearings which support the shafts and connect the driveshaft to the propeller shaft for rotation of the propellers 81, 82. In the example shown, no source of motive power is located below the hull surface; rather, the power necessary to rotate the propellers 81, 82 is solely provided by the internal combustion engine 86a, 86b.

Each of the input devices 120, 50, 122, 124 can be used to send commands to the PCMs 25, 26 via the CCM 116 to operate the propulsion devices 27, 28 in response to such commands in the normal operating, mode, as is known to those having ordinary skill in the art. Further, as described herein above with reference to FIGS. 1 and 2, the CCM 116 may also be connected in signal communication with PCMs 25, 26 in order to control the first and second propulsion devices 27, 28 in an alternative auto heading mode such that the vessel 10 maintains a desired heading in the direction of heading arrow 110. This may require that the vessel yaw (rotate) around its center of gravity 12 (see FIGS. 9-12) should wind, waves, or other external factors force the vessel 10 off course. The auto heading function can be implemented in different ways. For example, the operator of the marine vessel can choose a desired heading by entering an angle A1 into the interactive video display 120. Alternatively, the operator can activate the joystick 50 to orient the marine vessel 10 in the direction of a desired heading and thereafter maintain this desired heading by selecting a heading maintenance button provided at the interactive video display 120 or elsewhere on the operation console 118. Alternatively, the operator could orient the marine vessel in the direction of a desired heading using the steering wheel 122 and thereafter maintain this desired heading by selecting a heading maintenance button provided at the interactive video display 120 or elsewhere on the operation console 118. Alternatively, the operator could operate the marine vessel 10 in a waypoint tracking mode, in which the marine vessel 10 is propelled from one waypoint to another at a heading calculated to reach the desired waypoint. While operating in auto heading, mode, the operator can use the throttle/shift lever 124 to increase or decrease the speed of the marine vessel 10 as it is underway in the direction of the desired heading. While underway, the operator may also alter the desired heading, i.e., change the angle A1, by manipulating the steering wheel 122 or joystick 50. In one example, the operator can alter the heading of the marine vessel 10 by tapping the joystick 50 to the left or to the right, in the direction of arrows 62 or 63, respectively, to change the heading of the marine vessel 10 by one degree per tap.

In order to maintain the desired heading in the direction of heading arrow 110, the CCM 116 must have comparative information regarding both the desired heading (chosen by the operator or calculated based on a desired waypoint) and the actual heading and/or course in the direction of arrow 112. As described herein above, the desired heading may be input to the CCM 116 via the interactive video display 120, may be chosen by manipulation of the joystick 50 or steering wheel 122 in combination with activation of a heading maintenance button, or may be calculated based on a desired waypoint. The CCM 116 may be programmed to store the desired heading value at the point in time when the desired heading is selected. The CCM 116 may also be programmed to receive an input from the IMU 106 regarding the actual heading and/or course 112 of the marine vessel 10, which may be different from the desired heading 110 due to the effect of wind, waves, etc. as described above. The CCM 116 may be programmed to compare the actual heading and/or course with the desired heading. For example, the CCM 116 may be programmed to use the desired heading value at the point in time of setting as a reference value (for example, 0) and thereafter use the output of the IMU 106 as a relative heading value, for example angle A2, with respect to the reference desired heading value.

The CCM 116 compares the actual heading and/or course 112 detected by the IMU 106 with the desired heading 110. If for example, the difference between the desired heading 110 and the actual heading and/or course 112 (angle A2) exceeds a certain threshold value, the CCM 116 may position the propulsion devices 27, 28 and/or change the thrust provided by either of the propulsion devices 27, 28 in order to correct and thereafter maintain the heading at the desired value. For example, the CCM 116 can send a signal via the CAN bus to the PCMs 25, 26 to set angles of rotation of the first and second propulsion devices 27, 28 with respect to the marine vessel 10, to set engine speed, and/or to set shift position based on the required movement of the vessel 10 to achieve the desired heading.

The auto heading algorithm can also be provided with proportional integral derivative (PID) control. For example, the difference between the desired heading and actual heading and/or course (angle A2) can be input into a PID controller, for example the CCM 116, which can in turn output an actuation request to achieve a desired actuation in terms of position, throttle, and gear of the first and second propulsion devices 27, 28.

Figure 8:
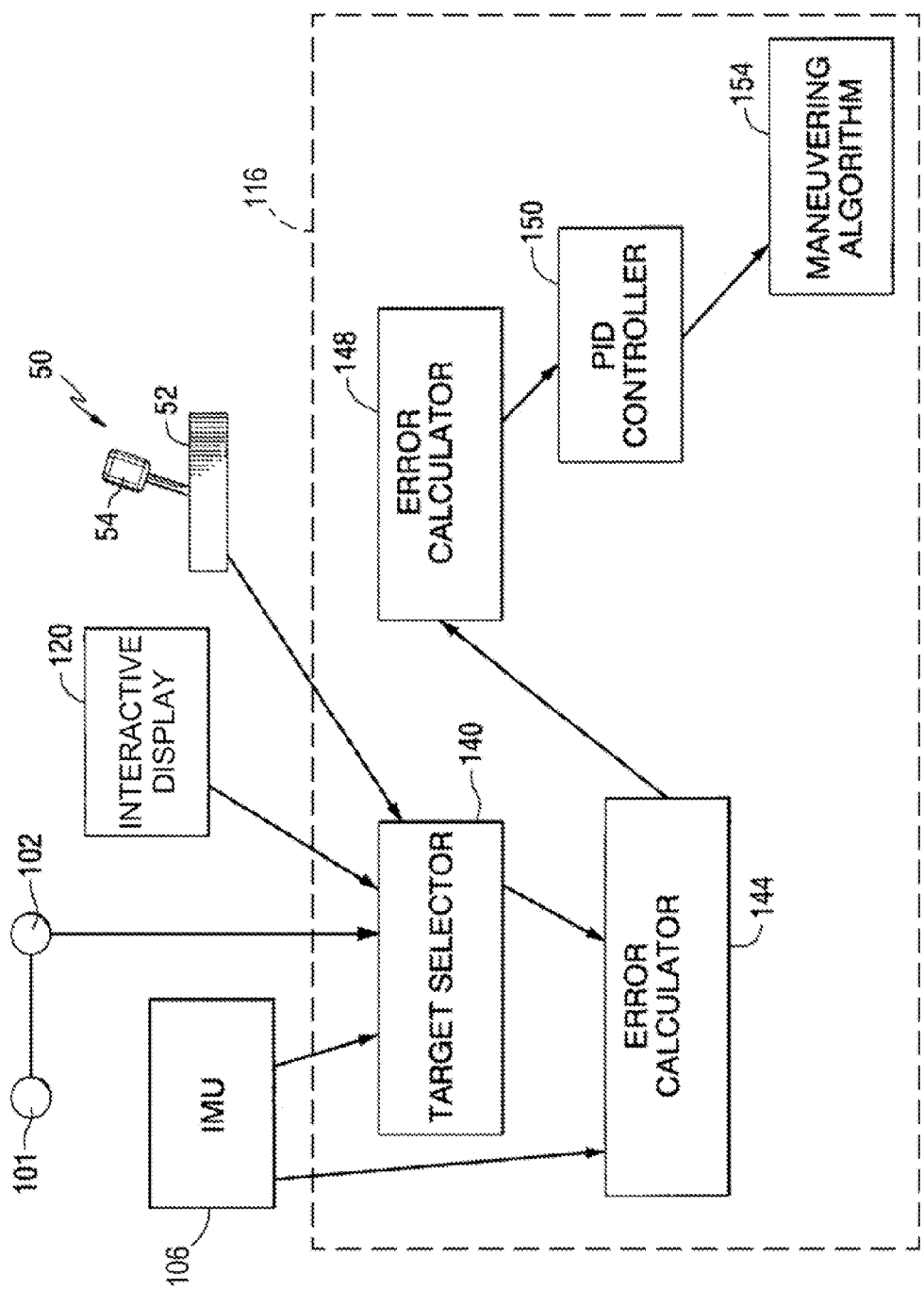
FIG. 8 is a block diagram of functional elements of the control circuit.

FIG. 8 is a schematic representation of the devices and software used in conjunction with the preferred embodiment of the present invention. As described above, the two GPS devices 101 and 102 provide information to the CCM 116 regarding the absolute global position, in terms of latitude and longitude, of the marine vessel 10. The IMU 106 provides information to the CCM 116 regarding the heading of the marine vessel 10 and regarding the velocity and acceleration of the marine vessel 10 in six degrees of freedom which include forward and reverse movement of the vessel, left and right movement of the vessel, and yaw (rotational) movements of the vessel. The CCM 116 is provided with software for executing the functions described further herein below. Although in FIG. 8 the software is shown within the CCM 116, it should be understood that these functions could be carried out by software stored on a different controller located elsewhere.

With continued reference to FIG. 8, a target selector portion 140 of the software receives inputs from the GPS devices 101 and 102, the IMU 106, the interactive video display 120, and the joystick 50. When the auto heading mode of the present disclosure is enabled, for example by the operator of the marine vessel inputting a desired heading via the interactive video display 120, the target selector portion 140 receives a desired heading magnitude and stores this value as the desired heading for the vessel 10. In another example, the auto heading mode is enabled by orienting the marine vessel 10 in the direction of a desired heading by using the joystick 50 or the steering wheel 122 (not shown in FIG. 8) and thereafter selecting the heading maintenance button, in which case the target selector portion 140 receives an actual heading magnitude from the IMU 106 and stores this value as the desired heading for the vessel 10. In another example, the operator chooses a desired waypoint using the interactive video display 120, and the target selector 140 calculates a desired heading based on the current global position of the marine vessel 10 and the desired global position at the desired waypoint. In each example, the desired heading information is stored in the memory of the CCM 116.

When in the auto heading mode, the IMU 106 periodically obtains new data regarding the actual heading and/or course of the marine vessel 10 and provides the actual heading and/or course information to an error calculator 144 within the CCM 116. This error calculator 144 compares the desired heading (e.g., in the direction of heading arrow 110) to the actual heading and/or course (e.g., in the direction of arrow 112). This comparison produces a difference magnitude which is defined in terms of a heading angular difference (e.g., angle A2). This information is provided to an error calculator 148 which resolves the value into a heading change in reference to clockwise and counterclockwise movement of the marine vessel 10. This error is provided to a PID controller 150.

A PID controller uses proportional, integral, and derivative techniques to maintain a measured variable at a preselected set point. Examples of this type of controller are used in cruise control systems for automobiles and temperature control systems of house thermostats. In the proportional band of the controller, the controller output is proportional to the error between the desired magnitude and the measured magnitude. The integral portion of the controller provides a controller output that is proportional to the amount of time that an error, or difference, is present. The integral portion of the controller reduces the offset. The derivative portion of the controller provides an output that is proportional to the rate of change of the measurement or of the difference between the desired magnitude and the actual magnitude. Each of the portions, or control strategies, of the PID controller typically uses an individual gain factor so that the controller can be appropriately tuned for each particular application. It should be understood that specific types of PID controllers and specific gains for the proportional, integral, and derivative portions of the controller are not limiting to the present invention.

With continued reference to FIG. 8, the error correction information provided by the PID controller 150 is used by a maneuvering algorithm 154, which will be more fully described herein below. The maneuvering algorithm 154 receives information describing required corrective vectors, both a linear corrective vector and a moment corrective vector, necessary to reduce the error or difference between the actual heading and/or course 112 and the desired heading 110. The maneuvering algorithm 154 will be more fully described below with reference to FIGS. 9-12.

It should be understood that an alternative example of the present disclosure could replace the two GPS devices 101, 102 with a single GPS device that provides information concerning the global position, in terms of longitude and latitude, of the marine vessel 10. This single GPS device could be used in combination with an electronic compass which provides heading information, as represented by heading arrow 110 or arrow 112, pertaining to the marine vessel 10. Additionally, other types of devices can be used besides the IMU 106 to provide information regarding the heading of the marine vessel 10. In other words, it is not necessary in all examples for the present disclosure to utilize two GPS devices to provide both global position and heading information. In other words, either an electronic compass or the GPS devices 101, 102 alone or in combination with the IMU 106 provide information relating to the global position and heading of the marine vessel 10, as represented by heading arrow 110 or arrow 112. In fact, any of a number of various combinations of devices is able to provide information identifying the global position and heading of the marine vessel 10.

Some propulsion systems that can be used with the marine vessel 10 of the present disclosure operate with direct drive transmissions. In a direct drive transmission, the input and output components of a transmission mainshaft can be locked together to create a known, fixed gear ratio, effectively meaning the input and output shafts of the transmission rotate as a single, solid shaft. Because the transmission provides a known, fixed input/output ratio, the speed of rotation of the propulsion devices 27, 28 is therefore directly fixedly related to the speed of the engine 86a, 86b. In marine arrangements with such direct drive transmissions, there has previously been no provision for trolling speeds due to the above-mentioned fixed relationship. Other propulsion systems that can be used with the marine vessel 10 of the present disclosure include trolling valves, which allow the propellers 37, 38 of the propulsion devices 27, 28 to turn at a speed slower than the speed of their associated engines 86a, 86b. Therefore, the present systems and methods advantageously provide for slower speeds of a marine vessel 10 either with a direct drive transmission or with a trolling valve (see 95 in FIG. 7). In one example, such slower speeds are achieved by positioning the first and second propulsion devices 27, 28 so that components of the first and second thrusts T1, T2 are no longer resolved in a forward direction such that the propulsion devices 27, 28 are splayed with respect to one another, as described herein below. In another example, such slower speeds are achieved by controlling a percentage of slip of trolling valves 95 on the propulsion devices 27, 28. In another example, both splay and slip are used to control the speed of the marine vessel.

Figure 9:
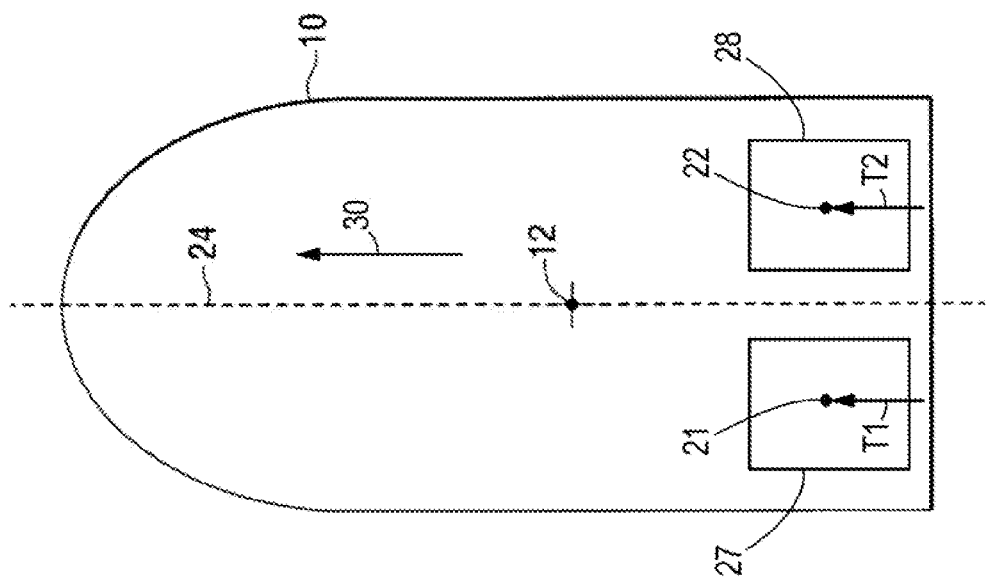

In FIG. 9, the marine vessel 10 is illustrated schematically with its center of gravity 12. First and second steering axes, 21 and 22, are illustrated to represent the location of first and second propulsion devices (reference numerals 27 and 28 in FIGS. 6 and 7) located under the hull of the marine vessel 10. (Note that the location of the steering axes would be different for the outboard motors shown in FIG. 2.) The first and second propulsion devices 27, 28 are rotatable about the first and second steering axes, 21 and 22, respectively. In one example, the first propulsion device 27, on the port side of a centerline 24, is configured to be rotatable 45 degrees in a clockwise direction, viewed from above the marine vessel 10, and 15 degrees in a counterclockwise direction. The second propulsion device 28, located on the starboard side of the centerline 24, is oppositely configured to rotate 15 degrees in a clockwise direction and 45 degrees in a counterclockwise direction. In another example, the first propulsion device 27 is rotatable only 30 degrees in the clockwise direction and the second propulsion device 28 is rotatable only 30 degrees in the counterclockwise direction. The ranges of rotation of the first and second propulsion devices 27, 28 are therefore symmetrical with respect to the centerline 24. The positioning method of the present disclosure rotates the first and second propulsion devices 27, 28 about their respective steering axes, 21 and 22, in an efficient manner that allows rapid and accurate maneuvering of the marine vessel 10.

FIG. 9 illustrates one element of the present disclosure that is used when it is desired to move the marine vessel 10 in a forward direction represented by arrow 30. In other words, it represents the situation in which the operator of the marine vessel 10 wishes to cause it to move in a forward direction with no movement in either a right or left direction and no rotation about its center of gravity 12. This is done by rotating the first and second propulsion devices 27, 28 into an aligned position, in which their thrust vectors T1 and T2 are parallel to one another. As can be seen in FIG. 9, the first and second thrust vectors, T1 and T2, are equal in magnitude and are directed in the same forward direction. This creates no resultant rotation about the center of gravity 12 and no resultant movement in either the left or right directions. Movement in the direction represented by arrow 30 results from all of the components of the first and second thrust vectors T1 and T2, being resolved in a direction parallel to arrow 30, as will be described further herein below. The resultant thrust components parallel to arrow 30 are additive and together provide forward thrust in the direction of arrow 30 to the marine vessel 10.

Figure 10:
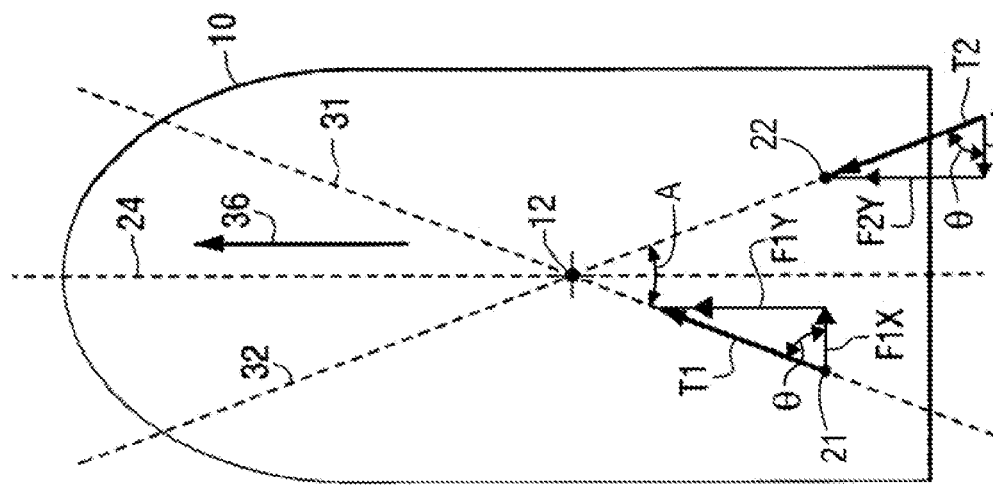
FIGS. 9 and 10 illustrate an arrangement of thrust vectors during forward movement of the marine vessel.

FIG. 10 illustrates another element of the present disclosure that is used when it is desired to move the marine vessel 10 in a forward direction represented by arrow 36. In other words, FIG. 10 also represents a situation in which the operator of the marine vessel 10 wishes to cause it to move in a forward direction with no movement to the right or left and no rotation about its center of gravity 12. However, if the magnitude of the thrust vectors T1 and T2 are the same in both FIGS. 9 and 10, the speed of the marine vessel 10 traveling in the direction of arrow 36 in FIG. 10 will be less than the speed of the marine vessel 10 traveling in the direction of arrow 30 in FIG. 9, as will be more fully described herein below.

FIG. 10 shows the first and second thrust vectors, T1 and T2, and the resultant forces of these two thrust, vectors. The propulsion devices (not shown) are in an unaligned position, wherein their thrust vectors T1 and T2 are non-parallel yet have equal magnitude. The first and second thrust vectors T1, T2 are directed along lines 31 and 32, respectively, which intersect at the center of gravity 12. As illustrated in FIG. 10, these two lines, 31 and 32, are positioned at angles θ. As such, the first and second propulsion devices are rotated symmetrically relative to the centerline 24. The first and second thrust vectors, T1 and T2, can be resolved into components, parallel to centerline 24, that are calculated as functions of the angle θ. For example, the first thrust vector T1 can be resolved into a forward directed force, F1Y and a side directed force F1X as shown in FIG. 10 by multiplying the first thrust vector T1 by the sine of θ and the cosine of θ, respectively. Similarly, the second thrust vector T2 is shown resolved into a forward directed force F2Y and a side directed force F2X by multiplying the second thrust vector T2 by the sine of θ and the cosine of θ, respectively. Because T1 and T2 are of equal magnitude and θ is the same for each thrust vector, the magnitudes of the side directed forces F1X and F2X are also equal. The equal and opposite side directed forces F1X and F2X therefore cancel and no resulting right or left force is exerted on the marine vessel 10. Further, because T1 and T2 are of equal magnitude and θ is the same for each thrust vector, no moment is exerted on the marine vessel 10 either. The forward directed forces, F1Y and F2Y, on the other hand, are additive and result in a forward movement represented by arrow 36. As a result, the only movement of the marine vessel 10 is in the forward direction represented by arrow 36.

Assuming that the first and second thrusts T1, T2 are of the same magnitude in both FIGS. 9 and 10, the marine vessel 10 in FIG. 9 will move at a faster speed than the marine vessel 10 in FIG. 10. This is because in FIG. 10 part of the magnitude of the thrust vectors T1, T2 (specifically the components resolved in the X direction, F1X and F2X) cancel one another out and thereby decrease the additive magnitude of the thrust that would otherwise have been available to propel the marine vessel 10 in a forward direction. By the same principle, the components resolved in the Y direction, F1Y and F2Y, are less in FIG. 10 than in FIG. 9 because the value of sine of θ in FIG. 10 is less than one (compare sine of 90 degrees in FIG. 9), and therefore less total thrust is imparted in the direction of arrow 36. In contrast, in FIG. 9, the thrust vectors T1, T2 are resolved in the Y direction only and the full additive magnitude of each thrust vector T1, T2 propels the marine vessel 10 in the direction of arrow 30.

The speed of the marine vessel 10 can be further decreased by orienting the propulsion devices 27, 28 such that even larger side directed forces F1X, F2X of the thrusts T1, T2 cancel each other out. For instance, as the thrust vectors T1, T2 are angled at increasingly lower values of θ, the value of cosine of θ increases, and increasingly larger side directed forces F1X, F2X cancel out. At the same time, as the thrust vectors T1, T2 are angled at increasingly lower values of θ, the value of sine of θ decreases, thereby decreasing the values of F1Y and F2Y and decreasing thrust in the forward direction. In other words, the closer the first and second propulsion devices 27, 28 are to the aligned position in which their thrusts are parallel, the greater the speed of the marine vessel 10. The more angled or unaligned the thrusts T1, T2 are with respect to one another, i.e., the lesser the value of θ, the lesser the speed of the marine vessel 10.

It can be seen from FIG. 10 that thrust vector T1 is oriented in a first direction (along line 31) with respect to the centerline 24 and thrust vector T2 is oriented at a second direction (along line 32) with respect to the centerline 24. A splay angle A can be defined between the direction of the first thrust and the direction of the second thrust. For example, as shown herein A=180°−(2×θ), where θ is defined as described above. The splay angle A is called such as it can be seen that when the marine propulsion devices 27, 28 are oriented to create the thrusts T1, T2 as shown in FIG. 10, their foremost parts are closer to one another than their aftmost parts, and their aftmost parts are therefore splayed out from one another when viewed from above. As the splay angle A increases, if the magnitude of thrust remains the same, the values of F1Y and F2Y decrease according to the principles described herein above, and the speed of the marine vessel 10 decreases correspondingly. It should be understood that although not shown herein, the propulsion devices 27, 28 could be oppositely splayed, such that their foremost parts are further from one another than their aftmost parts (i.e., their foremost parts are splayed out from one another when viewed from above) in order to achieve the same objective of reducing the speed of the marine vessel 10.

As described above, when the marine vessel 10 is engaged in auto heading, wind, waves, and other external factors can force the marine vessel 10 off of its course in the direction of heading arrow 110. For this reason, it is desirable to provide a control algorithm that adjusts the orientation of the propulsion devices 27, 28 such that their thrusts T1, T2 adaptably counteract such external factors to maintain the desired heading of the vessel 10 in the direction of heading arrow 110. This can be done for example by subjecting the marine vessel 10 to a moment to cause it to rotate about its center of gravity 12 (in other words, to "yaw") until it is once again pointed in the direction of heading arrow 110.

Figure 12:
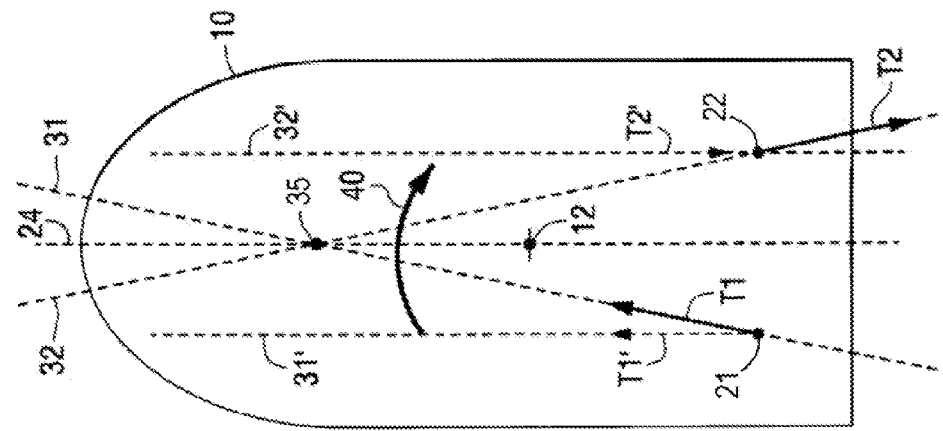
FIGS. 11 and 12 show an arrangement of thrust vectors used to rotate the marine vessel about its center of gravity.
Figure 11:
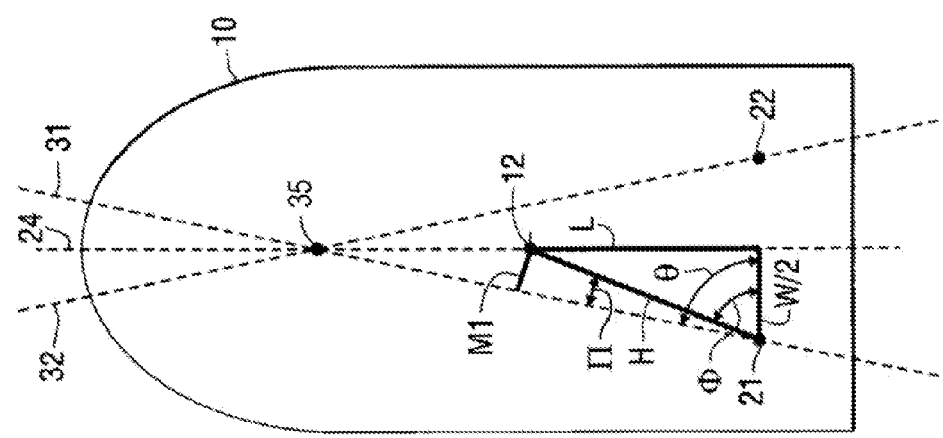

With reference to FIGS. 11 and 12, when it is desired that the marine vessel 10 be subjected to a moment to cause it to rotate about its center of gravity 12, the application of the concepts of the present disclosure depend on whether or not it is also desired that the marine vessel 10 be subjected to a linear force in either the forward/reverse or the left/right direction or a combination of both. When the operator wants to cause a combined movement, with both a linear force and a moment exerted on the marine vessel 10, the thrust vectors, T1 and T2, are caused to intersect at the point 35 as represented by dashed lines 31 and 32 in FIG. 12. If, on the other hand, the operator of the marine vessel 10 wishes to cause it to rotate about its center of gravity 12 with no linear movement in either a forward/reverse or a left/right direction, the thrust vectors, T1' and T2', are aligned in parallel association with each other and the magnitude of the first and second thrust vectors are directed in opposite directions as represented by dashed arrows T1' and T2' in FIG. 12. When the first and second thrust vectors, T1' and T2', are aligned in this way, the angle θ for both vectors is equal to 90 degrees and their alignment is symmetrical with respect to the centerline 24, but with oppositely directed thrust magnitudes.

When a rotation of the marine vessel 10 is desired in combination with linear movement, the first and second propulsion devices are rotated so that their thrust vectors intersect at a point on the centerline 24 other than the center of gravity 12 of the marine vessel 10. This is illustrated in FIG. 11. Although the thrust vectors T1 and T2 are not shown in FIG. 11, their associated lines, 31 and 32, are shown intersecting at a point 35 which is not coincident with the center of gravity 12. As a result, an effective moment arm M1 exists with respect to the first propulsion device 27 which is rotated about its first steering axis 21. Moment arm M1 is perpendicular to dashed line 31 along which the first thrust vector T1 is aligned. As such, it is one side of a right triangle which also comprises a hypotenuse H. It should also be understood that another right triangle in FIG. 11 comprises sides L, W/2, and the hypotenuse H. Although not shown in FIG. 11, for purposes of clarity, a moment arm M2 of equal magnitude to moment arm M1 would exist with respect to the second thrust vector T2 directed along line 32. Because of the intersecting nature of the thrust vectors, they each resolve into components in both the forward/reverse and left/right directions. The components, if equal in absolute magnitude to each other, may either cancel each other or be additive. If unequal in absolute magnitude, they may partially offset each other or be additive. However, a resultant force will exist in some linear direction when the first and second thrust vectors intersect at a point 35 on the centerline 24.

With continued reference to FIG. 11, those skilled in the art will recognize that the length of the moment arm M1 can be determined as a function of angle θ, angle φ, angle π, the distance between the first and second steering axes, 21 and 22, which is equal to W in FIG. 11, and the perpendicular distance between the center of gravity 12 and a line extending between the first and second steering axes 21, 22. This perpendicular distance is identified as L in FIG. 11. The length of the line extending between the first steering axis 21 and the center of gravity 12 is the hypotenuse H of the triangle shown in FIG. 11 and can easily be determined. The magnitude of angle φ is equivalent to the arctangent of the ratio of length L to the distance between the first steering axis 21 and the centerline 24, which is identified as W/2 in FIG. 11. Since the length of line H is known and the magnitude of angle π is known (θ−φ), the length of the moment arm M1 can be mathematically determined.

As described above, a moment, represented by arrow 40 in FIG. 12, can be imposed on the marine vessel 10 to cause it to rotate about its center of gravity 12. The moment 40 can be imposed in either rotational direction. In addition, the rotating force resulting from the moment 40 can be applied either in combination with a linear force on the marine vessel 10 or alone. In order to combine the moment 40 with a linear force, the first and second thrust vectors, T1 and T2, are positioned to intersect at the point 35 illustrated in FIG. 12. The first and second thrust vectors, T1 and T2, are aligned with their respective dashed lines, 31 and 32, to intersect at this point 35 on the centerline 24 of the marine vessel 10. If, on the other hand, it is desired that the moment 40 be the only force on the marine vessel 10, with no linear forces, the first and second thrust vectors, represented by T1' and T2' in FIG. 12, are aligned in parallel association with each other. This, effectively, causes angle θ to be equal to 90 degrees. If the first and second thrust vectors, T1' and T2', are then applied with equal magnitudes and in opposite directions, the marine vessel 10 will be subjected only to the moment 40 and to no linear forces. This will cause the marine vessel 10 to rotate about its center of gravity 12 while not moving in either the forward/reverse or the left/right directions.

In FIG. 12, the first and second thrust vectors, T1 and T2, are directed in generally opposite directions and aligned to intersect at the point 35 which is not coincident with the center of gravity 12. Although the construction lines are not shown in FIG. 12, effective moment arms, M1 and M2, exist with respect to the first and second thrust vectors T1, T2 and the center of gravity 12. Therefore, a moment is exerted on the marine vessel 10 as represented by arrow 40. If the thrust vectors T1 and T2 are equal to each other and are exerted along lines 31 and 32, respectively, and these are symmetrical about the centerline 24 and in opposite directions, the net component forces parallel to the centerline 24 are equal to each other and therefore no net linear force is exerted on the marine vessel 10 in the forward/reverse directions. However, the first and second thrust vectors, T1 and T2, also resolve into forces perpendicular to the centerline 24 which are additive. As a result, the marine vessel 10 in FIG. 12 will move toward the right as it rotates in a clockwise direction in response to the moment 40.

In order to obtain a rotation of the marine vessel 10 with no lateral movement in the forward/reverse or left/right directions, the first and second thrust vectors, represented as T1' and T2' in FIG. 12, are directed along dashed lines, 31' and 32', which are parallel to the centerline 24. The first and second thrust vectors, T1' and T2', are of equal and opposite magnitude. As a result, no net force is exerted on the marine vessel 10 in a forward/reverse direction. Since angle θ, with respect to thrust vectors T1' and T2', is equal to 90 degrees, no resultant force is exerted on the marine vessel 10 in a direction perpendicular to the centerline 24. As a result, a rotation of the marine vessel 10 about its center of gravity 12 is achieved with no linear movement.

With reference to FIGS. 3-4 and 9-12, it can be seen that movement of the joystick handle 54 can be used by the operator of the marine vessel 10 to represent virtually any type of desired movement of the marine vessel 10. In response to receiving a signal from the joystick 50, an algorithm determines whether or not a rotation (shown by moment 40) about the center of gravity 12 is requested by the operator. If no rotation is requested, the first and second propulsion devices are oriented so that their thrust vectors align in a forward parallel orientation, as shown in FIG. 9, and so long as the magnitude and direction of T1 are equal to that of T2, the marine vessel 10 will travel in a forward direction. In another example, if no rotation is requested, the first and second propulsion devices are rotated so that their thrust vectors align with the center of gravity 12 and intersect at that point, as shown in FIG. 10. This results in no moment being exerted on the marine vessel 10 regardless of the magnitudes or directions of the first and second thrust vectors, T1 and T2. The magnitudes and directions of the first and second thrust vectors are then determined mathematically, as described above in conjunction with FIGS. 10. If, on the other hand, the signal from the joystick 50 indicates that a rotation about the center of gravity 12 is requested, the first and second propulsion devices are directed along lines 31 and 32 that do not intersect at the center of gravity 12. Instead, they intersect at another point 35 along the centerline 24. As shown in FIG. 12, this intersection point 35 can be forward from the center of gravity 12. The thrusts T1 and T2 shown in FIG. 12 result in a clockwise rotation (shown by moment 40) of the marine vessel 10. Alternatively, if the first and second propulsion devices are rotated so that they intersect at a point along the centerline 24 which is behind the center of gravity 12, an opposite effect would be realized. It should also be recognized that, with an intersect point 35 forward from the center of gravity 12, the directions of the first and second thrusts, T1 and T2, could be reversed to cause a rotation of the marine vessel 10 in a counterclockwise direction.

The above principles regarding resolution of the thrust vectors T1, T2 into X components and Y components in order to achieve lateral movement, rotational movement, or a combination of the two comprise the maneuvering algorithm 154 of FIG. 8. In other words, the above described principles can be used to adjust the heading of the marine vessel 10 to maintain the desired heading while in auto heading mode. For instance, referring back to FIG. 1, in an example were the desired heading is in the direction of heading arrow 110 and the actual heading and/or course is in the direction of arrow 112, the functional elements of FIG. 8 may request a purely rotational movement of the marine vessel 10 by the angle A2, which purely rotational movement can be carried out according to the principles described with reference to thrust vectors T1' and T2' of FIG. 12.

According to the same principles discussed with reference to FIGS. 9-12, the present disclosure also provides a control system and method for reducing the speed of a marine vessel 10 below that at which the marine vessel 10 advances when the throttle/shift lever 124 is in the forward detent position and propelled by a minimum additive thrust that is related to the rotational speed of the engines 86a, 86b powering the first and second propulsion devices 27, 28. In other words, the present disclosure provides a control system and method for propelling a marine vessel 10 at trolling speeds. Further, slower trolling speeds can be achieved without altering the direction, for example the desired heading, of the marine vessel 10. This can be done according to a control algorithm carried out by the CCM 116 that orients the propulsion devices 27, 28 such that components of their thrust vectors T1, T2 cancel one another in order to achieve speeds slower than those achieved when the throttle/shift lever 124 is in the forward detent position.

Such cancelling of components of the thrust vectors T1, T2 of the first and second propulsion devices 27, 28 is carried out by controlling orientation of the first and second propulsion devices 27, 28 between an aligned position in which the first and second thrusts T1, T2 are parallel and an unaligned position in which the first and second thrusts T1, T2 are non-parallel. The parallel position is shown in FIG. 9, while the non-parallel position is shown in FIG. 10. Further, the cancelling of the components of the thrusts T1, T2 is also described herein above with reference to FIG. 10.

Figure 13:
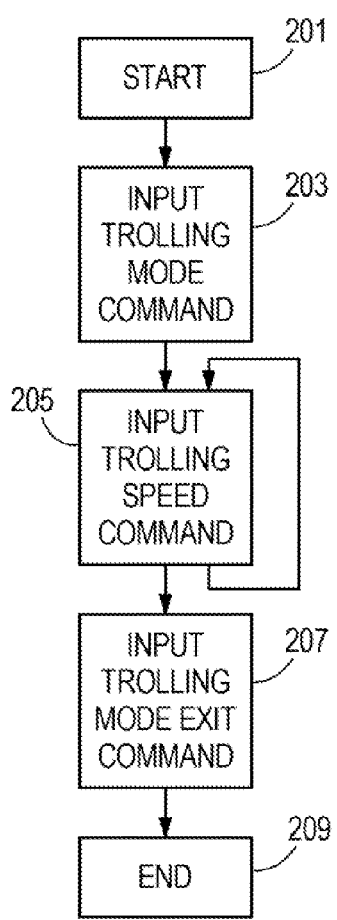
FIGS. 13 to 16 depict methods for controlling speed of a marine vessel.

A trolling mode can be selected by the operator of the marine vessel in the following manner with reference to FIG. 13. The method begins at box 201. At box 203, the operator inputs a trolling mode command to a control circuit 14 so as to operate the first and second propulsion devices 27, 28 in an aligned position (FIG. 9) in which the first and second thrusts T1, T2 are parallel and propel the marine vessel 10 in a desired direction at a first speed. In one example, the operator actuates the throttle/shift lever 124 into a forward detent position (FIG. 5) so as to input the trolling mode command to the control circuit 14 via the CCM 116. In other examples, the operator could actuate the throttle/shift lever 124 into the reverse detent position to select the trolling mode or the operator could make a trolling mode selection via the interactive video display 120.

At box 205, the operator thereafter inputs a trolling speed command to the control circuit 14 so as to operate the first and second propulsion devices 27, 28 in an unaligned position (FIG. 10) in which the first and second thrusts T1, T2 are non-parallel and propel the marine vessel 10 in the desired direction at a second, decreased speed. In one example, the operator actuates a joystick 50 in one of a first direction 60 and a second, opposite direction 61 while the throttle/shift lever 124 is in the forward detent position so as to input the trolling speed command to the control circuit 14. In other examples, the trolling speed could be commanded by the operator via the interactive video display 120 or via a trolling speed selection button located elsewhere at the operation console 118. The operator can continue to input trolling speed commands to the control circuit 14 so long as the control circuit 14 remains in the trolling mode, e.g., so long as the throttle/shift lever 124 remains in the forward detent position. This is described further herein below with reference to FIG. 14. At box 207, the operator can input a trolling mode exit command to the control circuit 14. For example, the operator can actuate the throttle/shift lever 124 out of the forward detent position so as to input the trolling mode exit command to the control circuit 14. The method then ends at box 209.

As described above, the joystick 50 is actuatable from a rest position as shown in FIGS. 3 and 4 in at least a first direction (for example, forward in the direction of arrow 60) and at least a second opposite direction (for example, backwards in the direction of arrow 61). In one example, when the throttle/shift lever 124 is in the forward detent position and when the joystick 50 is actuated backwards in the direction of arrow 61, the control circuit 14 receives a signal to decrease the speed of the marine vessel 10 below that at which the marine vessel 10 advances when the throttle/shift lever 124 is in the forward detent position. Actuation of the joystick 50 in the first direction (forward in the direction of arrow 60) thereafter commands the control circuit 14 to increase the speed of the marine vessel 10. In other words, after the operator has decreased the speed of the marine vessel 10 below the speed associated with forward detent position, the operator may then choose to increase the speed of the marine vessel 10 so as to re-approach the speed associated with forward detent position. This is described with reference to FIG. 14.

Figure 14:
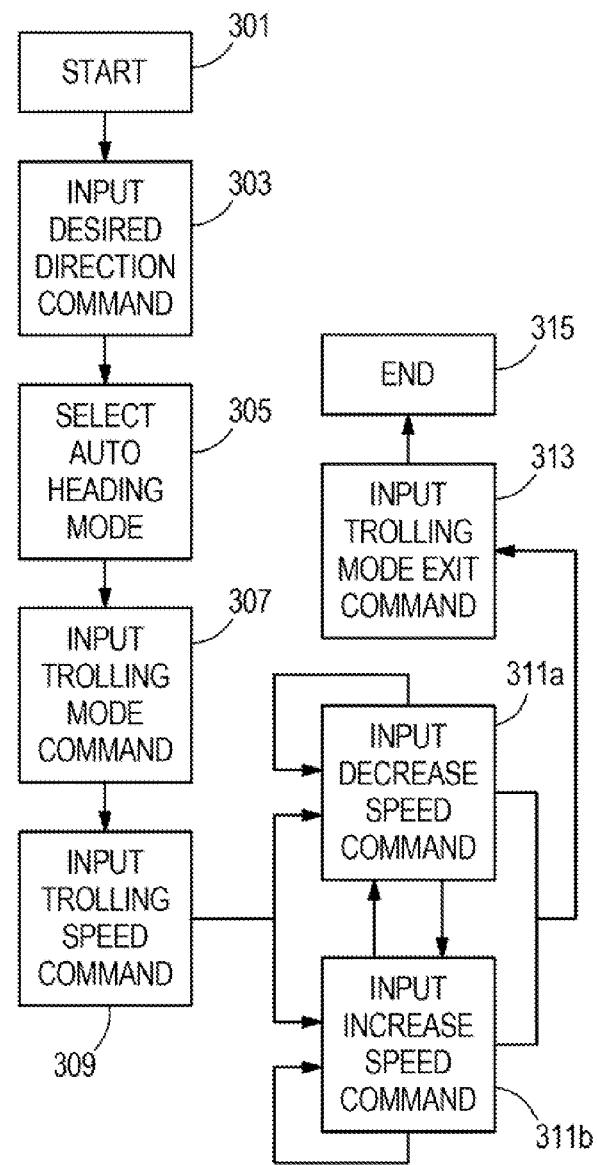

The method of FIG. 14 begins at box 301. At box 303, the operator inputs a desired direction command to the control circuit 14. This can be done according to the description herein above, e.g., with the joystick 50, interactive video display 120, or steering wheel 122. In one example, the desired direction can be a desired heading in the direction of heading arrow 110. Thereafter, at box 305, the operator selects an auto heading mode so as to maintain propulsion of the marine vessel 10 in the desired direction. Again, this can be done according to the description herein above, e.g., via the interactive video display 120. In another example, the operator selects both the desired heading and the auto heading mode at the same time rather than in sequence as shown in FIG. 14.

Next, at box 307, the operator inputs the trolling mode command to the control circuit 14, for example by placing the throttle/shift lever 124 in the forward detent position. In this mode, the first and second propulsion devices 27, 28 are in an aligned position in which the first and second thrusts T1, T2 are parallel and propel the marine vessel 10 in a desired direction at a first speed. For example, the first speed is a speed of the marine vessel 10 that is normally associated with the forward detent position of the throttle/shift lever 124 as described herein above with respect to direct drive transmissions, although the present disclosure relates to propulsion systems that utilize non-direct-drive transmissions as well. At box 309, the operator then inputs the trolling speed command to the control circuit 14 so as to operate the first and second propulsion devices 27, 28 in an unaligned position in which the first and second thrusts T1, T2 are non-parallel and propel the marine vessel 10 in the desired direction at a second, decreased speed. The operator can input the trolling speed command for example by actuating the joystick 50 in the second direction 61 while the throttle/shift lever 124 is in the forward detent position so as to command the control circuit 14 to decrease the speed of the marine vessel 10 to the second speed.

As shown at boxes 311a and 311b, after inputting the trolling speed command to the control circuit 14, the operator can thereafter choose to further decrease or alternatively to increase the speed of the marine vessel 10 while still operating in the trolling mode. For example, at box 311a, the operator can input a decrease speed command to the control circuit 14 to request even slower trolling speeds. This can be done, for example, by actuating the joystick 50 in the second direction 61 a second time, or with greater force than that used to input the trolling speed command as described with reference to box 309. In response to the decrease speed command, the control circuit 14 actuates the first and second propulsion devices 27, 28 such that greater side directed forces F1X, F2X cancel one another out and lesser forward directed forces F1Y, F2Y propel the marine vessel forward, as described above with reference to FIG. 10. In other words, the control circuit 14 controls the first and second propulsion devices 27, 28 to decrease the angle θ.

If, on the other hand, the operator desires to increase the speed of the marine vessel 10, as shown at box 311b, the operator inputs an increase speed command to the control circuit 14. For example, the operator actuates the joystick 50 in the first direction 60 after having actuated the joystick 50 in the second direction 61 (which was done to input the trolling speed command as described with reference to box 309) so as to command the control circuit 14 to increase the speed of the marine vessel 10 to re-approach the first speed. In response to the increase speed command, the control circuit 14 actuates the first and second propulsion devices 27, 28 such that lesser side directed forces F1X, F2X cancel one another out and greater forward directed forces F1Y, F2Y propel the marine vessel forward, as described above with reference to FIG. 10. In other words, the control circuit 14 controls the first and second propulsion devices 27, 28 to increase the angle θ.

As shown by the arrows between boxes 311a and 311b, the operator can continue to increase and decrease the speed of the marine vessel 10 while the control circuit 14 remains in the trolling speed mode. In other words, so long as the throttle/shift lever 124 remains in the forward detent position, by actuating the joystick 50 in the first and second directions 60, 61, the operator can request varying trolling speeds that are all below the speed of the marine vessel 10 that is normally associated with the forward detent position of the throttle/shift lever 124. At box 313, the operator can input a trolling mode exit command to the control circuit 14. For example, the operator can actuate the throttle/shift lever 124 out of the forward detent position so as to input the trolling mode exit command to the control circuit 14. The method then ends at box 315.

While in auto heading mode, both when the first user input device is in the detent position and when it is not, i.e., both when a trolling mode is commanded and when it is not, the control circuit 14 further controls orientation of the first and second propulsion devices 27, 28 to maintain the desired heading according to the description herein above. It should also be noted that while in auto heading mode, actuation of the joystick 50 from the rest position in third and fourth directions (for example, right in the direction of arrow 63 and left in the direction of arrow 62) that are opposite to one another and perpendicular to the first and second directions (forward and backward) can alter the desired heading of the marine vessel 10 by, for example, one degree per tap, as described herein above.

A method for controlling a speed of a marine vessel 10 having, first and second propulsion devices 27, 28 that produce first and second thrusts T1, T2, respectively, to propel the marine vessel 10 is also disclosed. The method comprises controlling orientation of the first and second propulsion devices 27, 28 between an aligned position (FIG. 9) in which the first and second thrusts T1, T2 are parallel and an unaligned position (FIG. 10) in which the first and second thrusts T1, T2 are non-parallel. The method further comprises receiving a first input from a first user input device, such as a throttle/shift lever 124, moveable between a neutral position and a non-neutral detent position, such as forward detent (FIG. 5). The method further comprises receiving a second input from a second user input device, such as a joystick 50. When the first user input device is in the detent position and the first and second propulsion devices 27, 28 are in the aligned position (FIG. 9) the first and second thrusts T1, T2 propel the marine vessel 10 in a desired direction 30 at a first speed. When the second user input device is actuated while the first user input device is in the detent position, the first and second propulsion devices 27, 28 move into the unaligned position (FIG. 10) so as to propel the marine vessel 10 in the desired direction 36 at a second, decreased speed without altering the first and second thrusts T1, T2.

Figure 15:
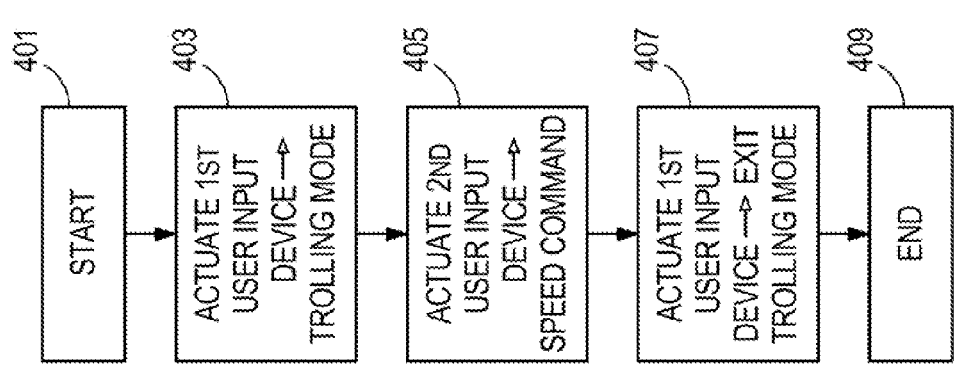

With reference to FIG. 15, a method for controlling a speed of a marine vessel 10 having a direct-drive transmission and having first and second propulsion devices 27, 28 that produce first and second thrusts T1, T2, respectively, to propel the marine vessel 10 will be described. The method begins at box 401. As shown at box 403, the operator of the marine vessel actuates a first user input device so as to select, a trolling mode. At box 405, the operator actuates a second user input device so as to vary a trolling speed of the marine vessel 10. As described herein above with reference to FIGS. 9 and 10, the trolling speed is varied as the first and second propulsion devices 27, 28 move between an aligned position in which the first and second thrusts T1, T2 are parallel and propel the marine vessel 10 in a desired direction at a first speed and an unaligned position in which the first and second thrusts T1, T2 are non-parallel and propel the marine vessel 10 in the desired direction at a second, decreased speed. Magnitudes of the first and second thrusts T1, T2 are the same when the first and second propulsion devices 27, 28 are in the aligned position (FIG. 9) as when the first and second propulsion devices 27, 28 are in the unaligned position (FIG. 10). In one example, the first user input device is a throttle/shift lever 124 and the second user input device is a joystick 50. As shown at box 407, the operator can once again actuate the first user input device to exit the trolling mode. The method ends at box 409.

In some instances, it may be desirable to vary the trolling speed of the marine vessel 10 while the marine vessel 10 is in the trolling mode. One way by which the trolling speed can be varied is by providing the operator with the ability to increase or decrease a speed of the engine 86a controlling the first propulsion device 27 and the engine 86b controlling the second propulsion device 28. In one example, in order to achieve trolling-like speeds, the speed of the engines 86a, 86b can be varied from about 600 RPM to about 1200 RPM, although other speed ranges are possible. In one example, the speed of the engine 86a is the same as the speed of the engine 86b. In one example, the speed of the engines 86a, 86b is able to be varied by manipulation of the joystick 50 in either the forward or rearward directions when the throttle/shift lever 124 is in the forward detent position.

Although varying the engine speed provides some level of control over the trolling speed of the marine vessel 10, it may be desirable to further vary the speed of the marine vessel 10 beyond the range that varying the engine speed provides. In this case, the control circuit 14 may choose to vary an alternative operating condition of the first and second propulsion devices 27, 28. In one example, the alternative operating condition is a slip of first and second transmissions 89a, 89b of the first and second propulsion devices 27, 28, respectively, which slip is provided, by a trolling valve 95 as discussed hereinabove. In this example, the slip of the first transmission

89a may be the same as the slip of the second transmission 89b. In another example, the alternative operating condition is the splay angle A between the direction of the first thrust T1 of the first propulsion device 27 and the direction of the second thrust T2 of the second propulsion device 28 (see FIG. 10).

Figure 16:
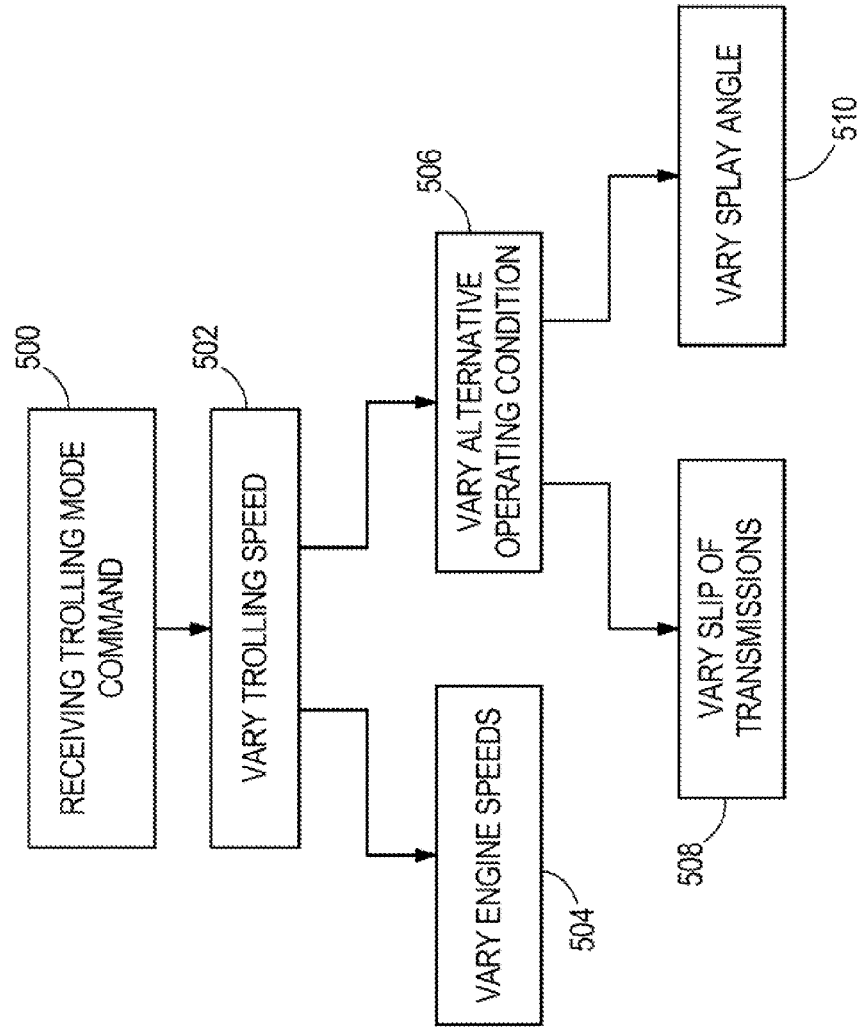

Now referring to FIG. 16, a method for controlling a speed of a marine vessel 10 having a first propulsion device 27 that produces a first thrust T1 to propel the marine vessel 10 and a second propulsion device 28 that produces a second thrust T2 to propel the marine vessel 10 will be described. The method comprises, as shown at 500, receiving a trolling mode command with a control circuit 14. For example, the trolling mode command can be received in response to actuation of a throttle/shift lever 124 into a forward gear detent position. The method next comprises, as shown at 502, varying a trolling speed of the marine vessel 10 with the control circuit 14. For example, varying the trolling speed of the marine vessel 10 can be in response to actuation of a joystick 50 in one of a first direction and a second, opposite direction while the throttle/shift lever 124 is in the forward gear detent position. In one example, the first direction is forward and the second direction is rearward. (See arrows 60 and 61, FIG. 4.) The trolling speed of the marine vessel 10 can be varied by doing one or more of the following: as shown at 504, varying a speed of a first engine 86a of the first propulsion device 27 and a second engine 86b of the second propulsion device 28; and as shown at 506, varying one or more alternative operating conditions of the first and second propulsion devices 27, 28. As shown at 508, varying the one or more alternative operating conditions may comprise varying the slip of first and second transmissions 89a, 89b of the first and second propulsion devices 27, 28, respectively. Additionally or alternatively, as shown at 510, varying the one or more alternative operating conditions may comprise varying orientation of the first and second propulsion devices 27, 28 about first and second steering axes 21, 22 respectively, so as to vary a splay angle A between a direction of the first thrust T1 and a direction of the second thrust T2 (see FIG. 10).

The method may further comprise doing one or more of the following in response to repeated actuation of the joystick 50 in the second (aft/rearward) direction: decreasing the speed of the first and second engines 86a, 86b until a minimum engine speed is reached; increasing the slip of the first and second transmissions 89a, 89b until a maximum slip is reached; and increasing the splay angle A until a maximum splay angle is reached. Similarly, but effecting the opposite result, the method may further comprise doing one or more of the following in response to repeated actuation of the joystick in the first (forward) direction: decreasing the splay angle A until a minimum splay angle is reached; decreasing the slip of the first and second transmissions 89a, 89b until a minimum slip is reached; and increasing the speed of the first and second engines 86a, 86b until a maximum engine speed is reached. Repeated actuation of the joystick in either the first or second direction (forward or rearward) can be accomplished in different ways. In one example, the operator may tap the joystick 50 forward or rearward, after which the joystick 50 returns to its upright center detent position. Repeated taps in the forward or rearward direction could further command the control circuit 14 to alter the engine speed or the alternative operating condition, depending on the current speed of the marine vessel 10. In another example, the operator could move the joystick 50 forward or rearward with more than a tap, i.e., with constant pressure, and the control circuit 14 could interpret this as repeated actuation via, for example, a potentiometer. For example, a continuous application of force in the forward direction might be interpreted as requesting greater and greater trolling speeds and vice versa for continuous application of force in the rearward direction.

Figure 17:
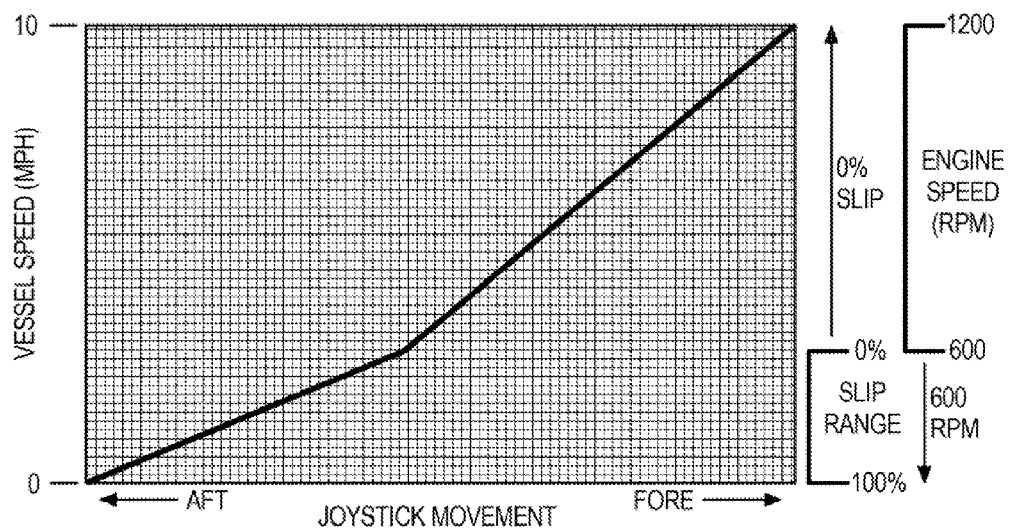
FIGS. 17 and 18 depict graphical representations of the speed of a marine vessel in response to movement of a joystick.
Figure 18:
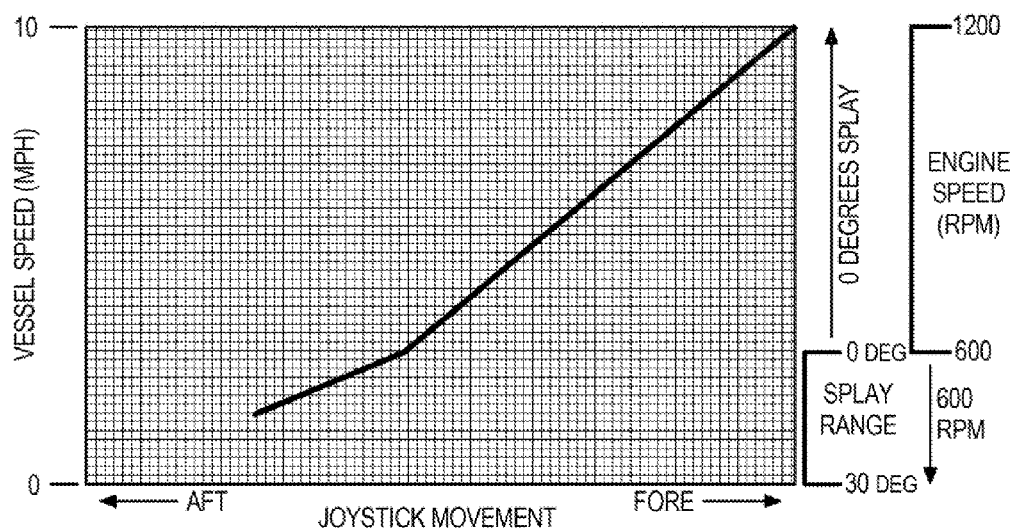

With reference FIGS. 17 and 18, the results of carrying out the above-described method are made clear. FIG. 17 shows an example in which the alternative operating condition is the slip of the first and second transmission 89a, 89b. For example, as shown in FIG. 17, by repeatedly actuating the joystick 50 in an aft or rearward direction, the engine speed can be changed from 1200 RPM until it reaches a minimum engine speed of 600 RPM. Once the minimum engine speed of 600 RPM is reached, further actuation of the joystick in the aft direction increases the slip of the first and second transmissions 89a, 89b from 0% to 100%, all the while decreasing the speed of the marine vessel 10. FIG. 17 also shows that conversely, repeated operation of the joystick 50 in the forward direction will decrease the slip of the transmission 89a, 89b until 0% slip is reached, after which repeated operation of the joystick 50 in the first direction will increase the engine speed. FIG. 18 shows an example in which the alternative operating condition is the splay angle A between a direction of the first thrust T1 and a direction of the second thrust T2. As shown in FIG. 18, for example, repeated actuation of the joystick in the aft/rearward direction decreases the engine speed from a maximum engine speed of 1200 RPM to a minimum engine speed of 600 RPM. Thereafter, additional actuation of the joystick in the aft direction further decreases the vessel speed as the splay angle A is increased from 0° to, for example, 30°. FIG. 18 also shows that conversely, repeated operation of the joystick 50 in the forward, direction will decrease the splay angle A until a splay angle of 0° is reached, after which repeated operation of the joystick in the forward direction will increase the engine speed.

Figure 19:
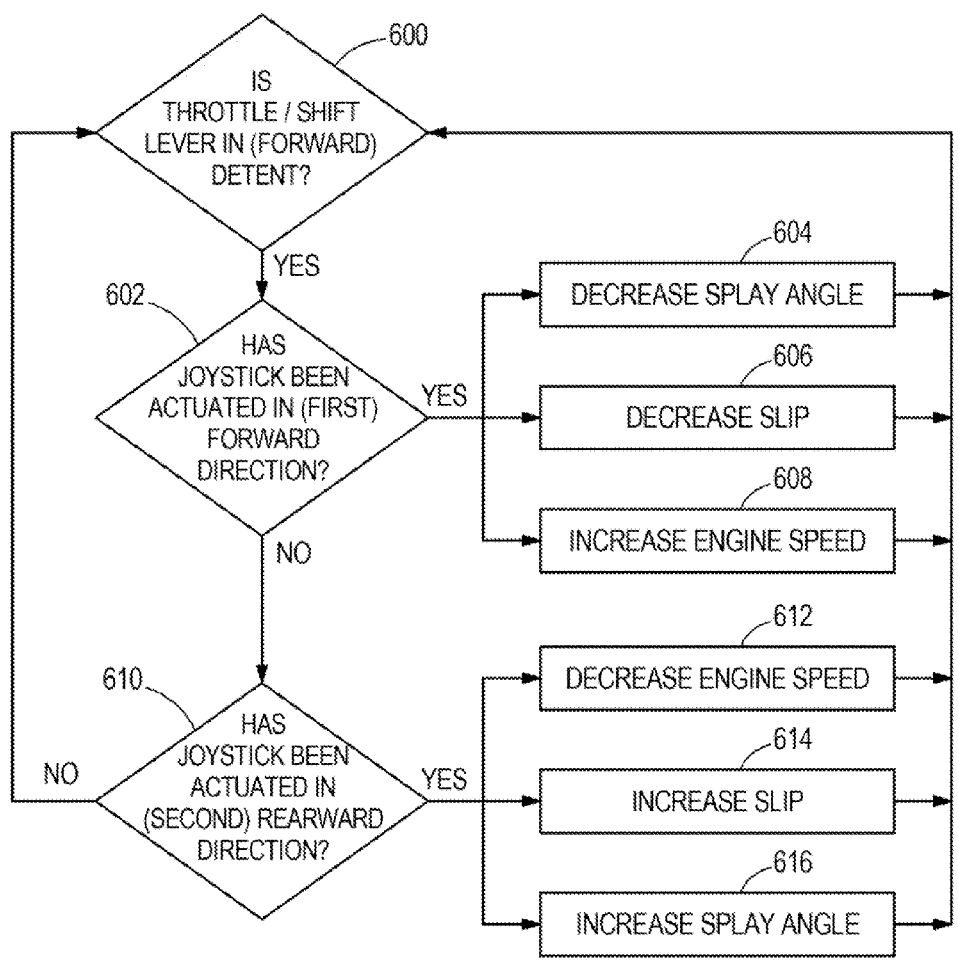
FIGS. 19 and 20 depict further methods for controlling speed of a marine vessel.

Now with reference to FIG. 19, a further method for controlling a speed of a marine vessel having first and second propulsion devices 27, 28 with first and second engines 86a, 86b operatively connected to first and second transmissions 89a, 89b, the first and second propulsion devices 27, 28 controlled by a control circuit 14 communicatively connected to a throttle/shift lever 124 and a joystick 50, comprises the following steps. As shown at 600, the method comprises determining if the throttle/shift lever 124 has been placed in a forward detent position. If so, at 602, the method continues with determining if the joystick 50 has been actuated in a forward (first) direction. If yes, the method continues with one of the following: decreasing a splay angle A between a direction of thrust T1 of the first propulsion device 27 and a direction of thrust T2 of the second propulsion device 28, as shown at 604; decreasing a slip of the first and second transmissions 89a, 89b, as shown at 606; and increasing a speed of the first and second engines 86a, 86b as shown at 608. After any of these steps, the method cycles back to step 600. If at 602 the joystick 50 has not been actuated in the forward direction, the method continues with determining if the joystick 50 has been actuated in the rearward (second) direction, as shown at 610. If yes, the method continues with one of the following: decreasing the speed of the first and second engines 86a, 86b, as shown at 612; increasing the slip of the first and second transmissions 89a, 89b, as shown at 614; and increasing the splay angle A, as shown at 616. After any of these steps, the method cycles back to step 600. If at 610 the determination as to whether the joystick 50 has been actuated in the rearward direction is no, the method cycles back to determining whether the throttle/shift lever 124 is in the forward detent position at 600.

In some examples, the control circuit 14 prioritizes one of decreasing the splay angle A and decreasing the slip over increasing the speed of the first and second engines 86a, 86b, in response to repeated actuation of the joystick 50 in the forward (first) direction. For example, the control circuit first decreases the splay angle A before increasing the engine speed, or first decreases the slip before increasing, the engine speed, in response to repeated actuation of the joystick 50 in the forward direction. If all three capabilities are available, in one example, the control circuit 14 first decreases the splay angle A, then decreases the slip, then increases the engine speed, in response to repeated actuation of the joystick 50 in the forward direction. In other examples, the control circuit 14 prioritizes decreasing the speed of the first and second engines 86a, 86b over one of increasing the slip and increasing the splay angle A in response to repeated actuation of the joystick 50 in the rearward (second) direction, according to the same principles. In other examples, it should be noted that any of the above systems and methods may alternatively or additionally include performing one or more of varying the engine speed, varying the slip of the transmissions, and varying the splay angle A of the propulsion units 27, 28 simultaneously in response to actuation of the joystick 50.

Figure 20:
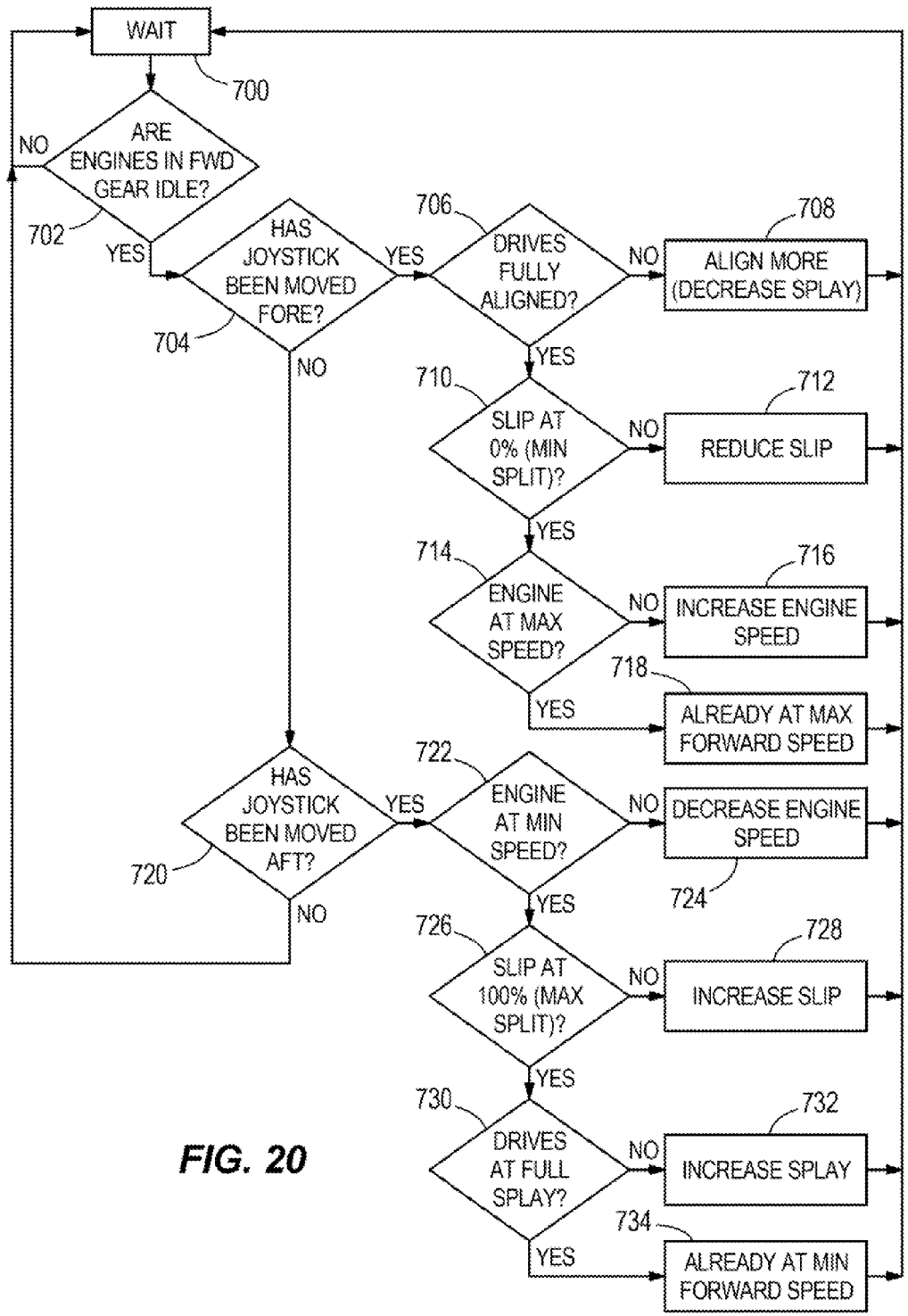

Now with reference to FIG. 20, a logic circuit that may be stored in the software of the control circuit 14 is described. As shown at 700, the control circuit 14 is placed in a waiting mode. A determination is then made as to whether the engines 86a, 86b and transmissions 89a, 89b are in forward gear idle, as shown at 702. If yes, a determination is made at 704 as to whether the joystick 50 has been moved in the first direction (forward). If yes, a determination is made at 706 as to whether the propulsion devices 27, 28 are fully aligned (e.g., the splay angle A is 0° and the first and second thrusts T1, T2 are in directions parallel to one another, see FIG. 9). If no, the control circuit 14 then moves the first and second propulsion devices 27, 28 by a predetermined angle increment such that they are closer to being aligned, i.e., decreases the splay angle 14, as shown at 708. If the determination at 706 is yes, the control circuit 14 next determines at 710 whether the slip of the first and second transmissions 89a, 89b is at a minimum (e.g., 0%). If no, the method continues to 712 where the control circuit 14 reduces the slip by a predetermined percentage increment. If yes at 710, the method continues to 714 where the control circuit 14 determines if the engine speed is at the maximum engine speed for trolling (e.g., 1200 RPM). If no, the method continues to 716 and the engine speed is increased by a predetermined RPM increment. If yes at 714, the control circuit 14 determines that the marine vessel 10 is already at its maximum forward trolling speed at 718. After each step 708, 712, 716, 718, the method returns to wait at 700 where the control circuit 14 waits to see if the joystick will be repeatedly actuated or not. These steps allow the operator of the marine vessel 10 to increase the speed of the marine vessel 10 to its maximum trolling speed.

Returning to the determination at 704, if the joystick 50 has not been moved in the first direction (forward) a determination is made at 720 as to whether the joystick 50 has been moved in the second direction (rearward). If yes, the method continues to 722 where the control circuit 14 determines if the engine speed is at the minimum engine speed for trolling (e.g., 600 RPM). If no, the method continues to 724, where the control circuit 14 decreases the engine speed by a predetermined RPM increment. If yes at 722, the method continues to 726 where the control circuit 14 determines if the slip is at a maximum slip (e.g., 100%). If no, the control circuit 14 continues to 728, and increases the slip by a predetermined percentage increment. If yes at 726, the method continues to 730, where the control circuit 14 determines if the first and second propulsion devices 27, 28 are fully splayed (or at a maximum splay angle A, e.g., 30°). If no, the method continues to 732 and the control circuit 14 increases the splay (angle A) between the direction of thrusts of the first and second propulsion devices by a predetermined angle increment. If yes at 730, the control circuit 14 determines that the system is already at minimum forward trolling speed at 734 and returns to wait at 700. After each of steps 724, 728, 732, and 734, the method continues to wait at 700 where the control circuit 14 waits to see if the joystick 50 will be repeatedly actuated. Returning to 720, if the control circuit 14 determines that the joystick 50 has not been moved in the second direction (rearward) the control circuit 14 also returns the method to wait at 700.

It should be noted that if trolling valves 95 for provision of transmission slip are not available on the marine vessel 10, the determinations at 710 and at 726 are yes. Effectively, the control circuit 14 ignores determinations regarding the slip and instead utilizes engine speed and splay to vary boat trolling speed. It should also be understood that if the marine propulsion devices 27, 28 are not capable of being splayed with respect to one another, the determinations at 706 and 730 are yes. In effect, the control circuit 14 ignores the splay capability and instead utilizes engine speed and slip to vary boat trolling speed.

The logic of FIG. 20 cycles for each repeated actuation of the joystick 50. For example, the logic is carried out for one tap of the joystick in the fore or aft direction. The logic may also be carried out for, e.g., every X degrees of continual actuation of the joystick 50 in the forward or rearward direction. For each cycle through the logic circuit, the operating condition that is varied (engine speed, splay angle, or slip percentage) may be varied by a given increment programmed into the software. Repeated actuation of the joystick 50 in the same direction will cause the operating condition to be varied by that predetermined increment until the operating condition reaches a threshold point at which a different operating condition will then be varied in order to further vary the speed of the marine vessel 10.

It should be understood that the thresholds at which the control circuit 14 switches from varying engine speed (e.g., 600 RPM as a lower threshold and 1200 RPM as an upper threshold) to varying an alternative operating condition are merely exemplary, and different thresholds could be chosen. For example, the upper engine speed threshold could instead be 1800 RPM. Further, the thresholds at which control circuit 14 switches from varying one alternative operating condition versus another, or from varying an alternative operating condition to varying the engine speed, (e.g., lower and upper thresholds of 0° to 30° for splay angle A and lower and upper thresholds of 0% to 100% for slip) are also merely exemplary, and different thresholds could be chosen. Additionally, the predetermined increments at which the engine speed, slip percentage, and/or splay angle are varied are also a matter of design choice and not limiting on the scope of the present disclosure.

In the above description certain terms have been used for brevity, clarity and understanding. No unnecessary limitations are to be implied therefrom beyond the requirement of the prior art because such terms are used for descriptive purposes only and are intended to be broadly construed. The different systems and methods described herein above may be used in alone or in combination with other systems and methods. Various equivalents, alternatives and modifications are possible within the scope of the appended claims. Each limitation in the appended claims is intended, to invoke interpretation under 35 USC §112(f) only the terms "means for" or "step for" are explicitly recited in the respective limitation.

While each of the method claims includes a specific series of steps for accomplishing certain control system functions, the scope of this disclosure is not intended to be bound by the literal order or literal content of steps described herein, and non-substantial differences or changes still fall within the scope of the disclosure.

What is claimed is:

1. A system that controls a speed of a marine vessel, the system comprising:
   a first propulsion device that produces a first thrust to propel the marine vessel;
   a second propulsion device that produces a second thrust to propel the marine vessel;
   a control circuit that controls orientation of the first and second propulsion devices about first and second steering axes, respectively, so as to control a direction of the first thrust and a direction of the second thrust;
   a first user input device moveable between a neutral position and a non-neutral detent position; and
   a second user input device;
   wherein when the second user input device is actuated while the first user input device is in the detent position, the control circuit selects between doing one or more of the following so as to control the speed of the marine vessel:
      varying a speed of a first engine of the first propulsion device and a second engine of the second propulsion device; and
      varying one or more alternative operating conditions of the first and second propulsion devices.

2. The system of claim 1, wherein the first user input device is a throttle/shift lever and the second user input device is a joystick that is actuatable from a rest position in at least a first direction and a second, opposite direction.

3. The system of claim 2, wherein when the throttle/shift lever is in the detent position, actuation of the joystick in the first direction commands the control circuit to increase the speed of the marine vessel, and actuation of the joystick in the second direction commands the control circuit to decrease the speed of the marine vessel.

4. The system of claim 3, wherein the one or more alternative operating conditions comprises:
   a splay angle between the direction of the first thrust and the direction of the second thrust; and
   a slip of first and second transmissions of the first and second propulsion devices, respectively.

5. The system of claim 4, further comprising first and second trolling valves controlling the slip of the first and second transmissions, respectively.

6. The system of claim 4, wherein upon repeated actuation of the joystick in the first direction, the control circuit does one or more of the following:
   decreases the splay angle until a minimum splay angle is reached;
   decreases the slip of the first and second transmissions until a minimum slip is reached; and
   increases the speed of the first and second engines until a maximum engine speed is reached.

7. The system of claim 6, wherein the control circuit prioritizes one of decreasing the splay angle and decreasing the slip over increasing the engine speed in response to repeated actuation of the joystick in the first direction.

8. The system of claim 4, wherein upon repeated actuation of the joystick in the second direction, the control circuit does one or more of the following:
   decreases the speed of the first and second engines until a minimum engine speed is reached;
   increases the slip of the first and second transmissions until a maximum slip is reached; and
   increases the splay angle until a maximum splay angle is reached.

9. The system of claim 8, wherein the control circuit prioritizes decreasing the engine speed over one of increasing the slip and increasing the splay angle in response to repeated actuation of the joystick in the second direction.

10. A method for controlling a speed of a marine vessel having a first propulsion device that produces a first thrust to propel the marine vessel and a second propulsion device that produces a second thrust to propel the marine vessel, the method comprising:
    receiving a trolling mode command from a first user input device with a control circuit; and
    thereafter varying a trolling speed of the marine vessel with the control circuit by selecting between doing one or more of the following in response to an input from a second user input device:
       varying a speed of a first engine of the first propulsion device and a second engine of the second propulsion device; and
       varying one or more alternative operating conditions of the first and second propulsion devices;
    wherein varying the one or more alternative operating conditions comprises one or more of the following:
       varying a slip of first and second transmissions of the first and second propulsion devices, respectively; and
       varying orientation of the first and second propulsion devices about first and second steering axes, respectively, so as to vary a splay angle between a direction of the first thrust and a direction of the second thrust.

11. The method of claim 10, wherein the first user input device is a throttle/shift lever, and further comprising receiving the trolling mode command in response to actuation of the throttle/shift lever into a forward gear deters position.

12. The method of claim 11, wherein the second user input device is a joystick, and further comprising varying the trolling speed of the marine vessel in response to actuation of the joystick in one of a first direction and a second, opposite direction while the throttle/shift lever is in the forward gear detent position.

13. The method of claim 12, further comprising one of increasing the trolling speed of the marine vessel in response to actuation of the joystick in the first direction while the throttle/shift lever is in the forward gear detent position, and decreasing the trolling speed of the marine vessel in response to actuation of the joystick in the second direction while the throttle/shift lever is in the forward gear detent position.

14. The method of claim 13, further comprising doing one or more of the following in response to repeated actuation of the joystick in the first direction:
    decreasing the splay angle until a minimum splay angle is reached;
    decreasing the slip of the first and second transmissions until a minimum slip is reached; and
    increasing the speed of the first and second engines until a maximum engine speed is reached.

15. The method of claim 14, wherein the control circuit prioritizes one of decreasing the splay angle and decreasing the slip over increasing the speed of the first and second engines in response to repeated actuation of the joystick in the first direction.

16. The method of claim 13, further comprising doing one or more of the following in response to repeated actuation of the joystick in the second direction:

decreasing the speed of the first and second engines until a minimum engine speed is reached;

increasing the slip of the first and second transmissions until a maximum slip is reached; and increasing the splay angle until a maximum splay angle is reached.

17. The method of claim 16, wherein the control circuit prioritizes decreasing the speed of the first and second engines over one of increasing the slip and increasing the splay angle in response to repeated actuation of the joystick in the second direction.

18. A method for controlling a speed of a marine vessel having first and second propulsion devices with first and second engines operatively connected to first and second transmissions, the first and second propulsion devices controlled by a control circuit communicatively connected to a throttle/shift lever and a joystick, the method comprising:

determining if the throttle/shift lever has been placed in a forward detent position, and if so:

determining if the joystick has been actuated in a forward direction, and, if so doing one of the to following:

decreasing a splay angle between a direction of thrust of the first propulsion device and a direction of thrust of the second propulsion device;

decreasing a slip of the first and second transmissions; and increasing a speed of the first and second engines; and determining if the joystick has been actuated in a rearward direction, and, if so doing one of the following:

decreasing the speed of the first and second engines;

increasing the slip of the first and second transmissions; and increasing the splay angle;

wherein the control circuit prioritizes one of decreasing the splay angle and decreasing the slip over increasing the speed of the first and second engines in response to repeated actuation of the joystick in the forward direction; and wherein the control circuit prioritizes decreasing the speed of the first and second engines over one of increasing the slip and increasing the splay angle in response to repeated actuation of the joystick in the rearward direction.

19. The method of claim 18, wherein the speed of the first and second engines is a trolling speed, and a minimum speed of the first and second engines is about 600 RPM and a maximum speed of the first and second engines is about 1200 RPM.

* * * * *

UNITED STATES PATENT AND TRADEMARK OFFICE
CERTIFICATE OF CORRECTION

PATENT NO. : 9,248,898 B1
APPLICATION NO. : 14/258516
DATED : February 2, 2016
INVENTOR(S) : Thomas S. Kirchhoff et al.

It is certified that error appears in the above-identified patent and that said Letters Patent is hereby corrected as shown below:

In the claims,

In claim 11, at column 26, line 37, "deters" should instead read --detent--.

In claim 18, at column 27, line 22, delete the word "to".

Signed and Sealed this
Nineteenth Day of April, 2016

Michelle K. Lee
*Director of the United States Patent and Trademark Office*